United States Patent
Mao

(10) Patent No.: US 10,885,603 B2
(45) Date of Patent: Jan. 5, 2021

(54) ALPHA BLENDING AND DISPLAY UPDATE BANDWIDTH SAVING DURING RENDER AND DISPLAY OPERATIONS

(71) Applicant: INTEL CORPORATION, Santa Clara, CA (US)

(72) Inventor: Xiaocheng Marc Mao, Shanghai (CN)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 15/776,778

(22) PCT Filed: Dec. 25, 2015

(86) PCT No.: PCT/CN2015/098912
§ 371 (c)(1),
(2) Date: May 16, 2018

(87) PCT Pub. No.: WO2017/107183
PCT Pub. Date: Jun. 29, 2017

(65) Prior Publication Data
US 2018/0330468 A1     Nov. 15, 2018

(51) Int. Cl.
*G09G 5/00*     (2006.01)
*G06T 1/60*     (2006.01)
(Continued)

(52) U.S. Cl.
CPC .............. *G06T 1/60* (2013.01); *G06T 1/20* (2013.01); *G06T 15/503* (2013.01)

(58) Field of Classification Search
CPC ..... G06T 15/503; G06T 1/60; G06T 2210/62; G09G 2340/12; G09G 5/393;
(Continued)

(56) References Cited

U.S. PATENT DOCUMENTS

2007/0222955 A1*   9/2007   Kubota ..................... G06F 3/14
                                                              355/18
2007/0285439 A1*   12/2007   King ..................... G09G 5/397
                                                             345/638
(Continued)

FOREIGN PATENT DOCUMENTS

WO     WO 200137220 A1     5/2001

OTHER PUBLICATIONS

International Preliminary Report on Patentability received for PCT Patent Application No. PCT/CN2015/098912, dated Jul. 5, 2018, 6 pages.
(Continued)

*Primary Examiner* — Hau H Nguyen
(74) *Attorney, Agent, or Firm* — Jaffery Watson Mendonsa & Hamilton LLP

(57) ABSTRACT

Embodiments provide for a graphics processing apparatus comprising a graphics processing engine configured for tiled memory access. In one embodiment the graphics processing engine is configured to render pixel data to a tile of memory and write to metadata associated with the tile of memory that indicates a data characteristic of the pixel data. The data characteristic of the pixel data includes whether the pixel data is transparent or whether the pixel data is an update of data from a previous frame.

26 Claims, 23 Drawing Sheets

(51) Int. Cl.
*G06T 15/50* (2011.01)
*G06T 1/20* (2006.01)

(58) Field of Classification Search
CPC ....... G09G 2360/121; G09G 2360/122; G09G 5/377; G09G 5/39; G09G 5/397; H04N 19/21
See application file for complete search history.

(56) References Cited

U.S. PATENT DOCUMENTS

| | | | |
|---|---|---|---|
| 2014/0133748 A1* | 5/2014 | Wright | G06T 11/00 382/167 |
| 2014/0320512 A1* | 10/2014 | Seetharamaiah | G06T 15/005 345/564 |
| 2014/0340419 A1 | 11/2014 | Otero et al. | |
| 2014/0354664 A1* | 12/2014 | Brown | G09G 5/363 345/545 |
| 2015/0070393 A1 | 3/2015 | Wu et al. | |
| 2015/0123993 A1 | 5/2015 | Obha et al. | |
| 2015/0317763 A1* | 11/2015 | Mather | G06T 1/60 345/506 |
| 2016/0314557 A1* | 10/2016 | Croxford | G06T 1/60 |

OTHER PUBLICATIONS

State IP Office of PR China—International Search Report of the International Searching Authority dated Sep. 23, 2016 for International Application No. PCT/CN2015/098912 (3 pgs).

State IP Office of PR China—Written Opinion of the International Searching Authority dated Sep. 23, 2016 for International Application No. PCT/CN2015/098912 (4 pgs).

* cited by examiner

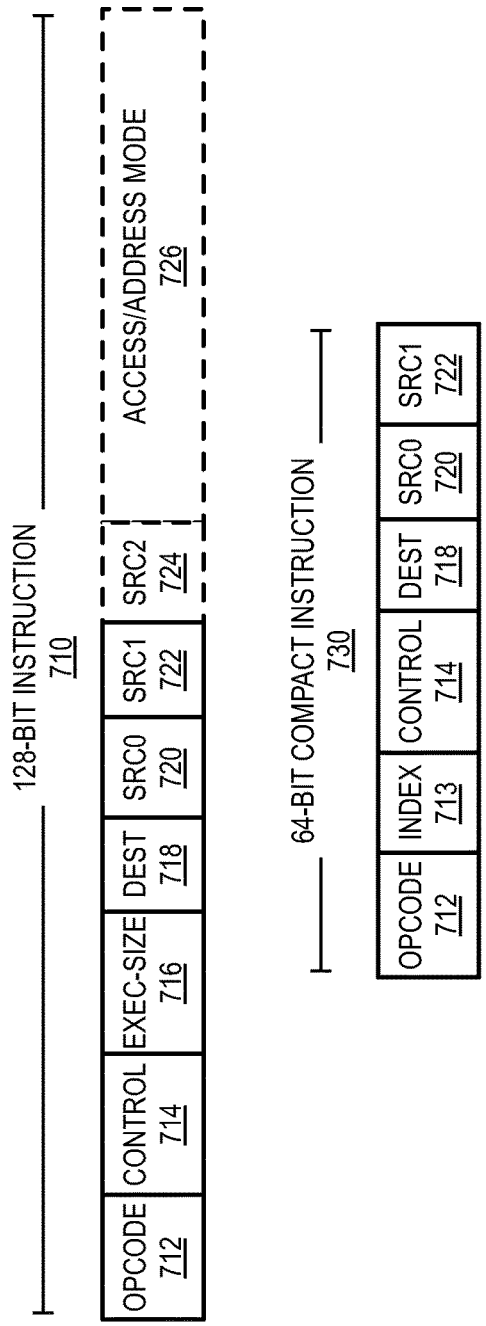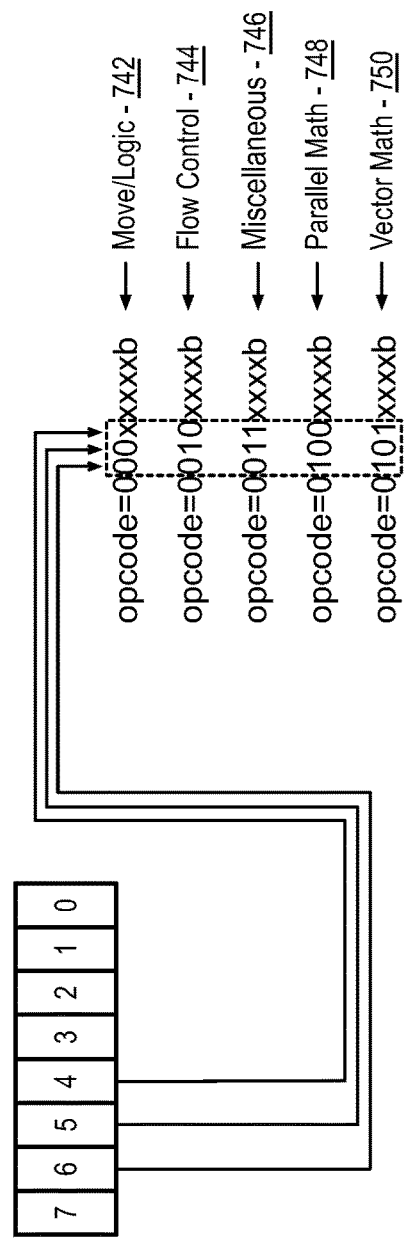
FIG. 7

FIG. 9A — GRAPHICS PROCESSOR COMMAND FORMAT 900

FIG. 9B — GRAPHICS PROCESSOR COMMAND SEQUENCE 910

DIRTY TILE BITMAP - 1800

ALPHA BLENDING AND DISPLAY UPDATE BANDWIDTH SAVING DURING RENDER AND DISPLAY OPERATIONS

CROSS-REFERENCE TO RELATED APPLICATIONS

This patent application is a U.S. National Phase application under 35 U.S.C. § 371 of International Application No. PCT/CN2015/098912, filed on 25 Dec. 2015, entitled ALPHA BLENDING AND DISPLAY UPDATE BANDWIDTH SAVING DURING RENDER AND DISPLAY OPERATIONS, the content of which is incorporated by reference in its entirety.

TECHNICAL FIELD

Embodiments generally relate to graphics processing logic. More particularly, embodiments relate to graphics processing logic to perform render operations.

BACKGROUND

In user interface window composition for a variety of operating systems, alpha blending is largely used. In many cases such as gaming or video playback, a large part of the blending layer is transparent. However, the transparent portion is still blended with the underlying layer by either a graphics processing engine of a graphics processor unit (GPU) or a display engine of the graphics processing unit. The graphics processing engine can use programmable execution units and pixel shading logic to perform a blend operation on the various display surfaces before transmitting the blended layer to a display device. Alternatively, a display controller on the GPU can use fixed function hardware to blend multiple distinct display surfaces in memory before a blended representation of the display surface is transmitted to the display device. Existing hardware supports a blending optimization that relies on the operating system and/or a graphics or media application to define a clipping region that is provided to the graphics processing engine or display device to limit the region over which the blending operations are to be performed. However, in many cases the applications do not define the necessary clipping region to optimize the blending, causing the entire display surface to be blended.

BRIEF DESCRIPTION OF THE DRAWINGS

The various advantages of the embodiments will become apparent to one skilled in the art by reading the following specification and appended claims, and by referencing the following drawings, in which:

FIG. 7 illustrates a graphics processor execution unit instruction format according to an embodiment;

DETAILED DESCRIPTION

For the purposes of explanation, numerous specific details are set forth to provide a thorough understanding of the various embodiments described below. However, it will be apparent to a skilled practitioner in the art that the embodiments may be practiced without some of these specific details. In other instances, well-known structures and devices are shown in block diagram form to avoid obscuring the underlying principles, and to provide a more thorough understanding of embodiments. Although some of the following embodiments are described with reference to a graphics processor, the techniques and teachings described herein may be applied to various types of circuits or semiconductor devices, including general purpose processing devices or graphic processing devices. Reference herein to "one embodiment" or "an embodiment" indicate that a particular feature, structure, or characteristic described in connection or association with the embodiment can be included in at least one of such embodiments. However, the appearances of the phrase "in one embodiment" in various places in the specification do not necessarily all refer to the same embodiment.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

In the description that follows, FIGS. 1-12 provide an overview of exemplary data processing system and graphics processor logic that incorporates or relates to the various embodiments. FIGS. 13-23 provide specific details of the various embodiments. Although some of the following embodiments are described with reference to a graphics processor, similar techniques and teachings can be applied to other types of circuits or semiconductor devices, as the teachings are applicable to any processor or machine that manipulates or processes image data.

System Overview

Figure 1:
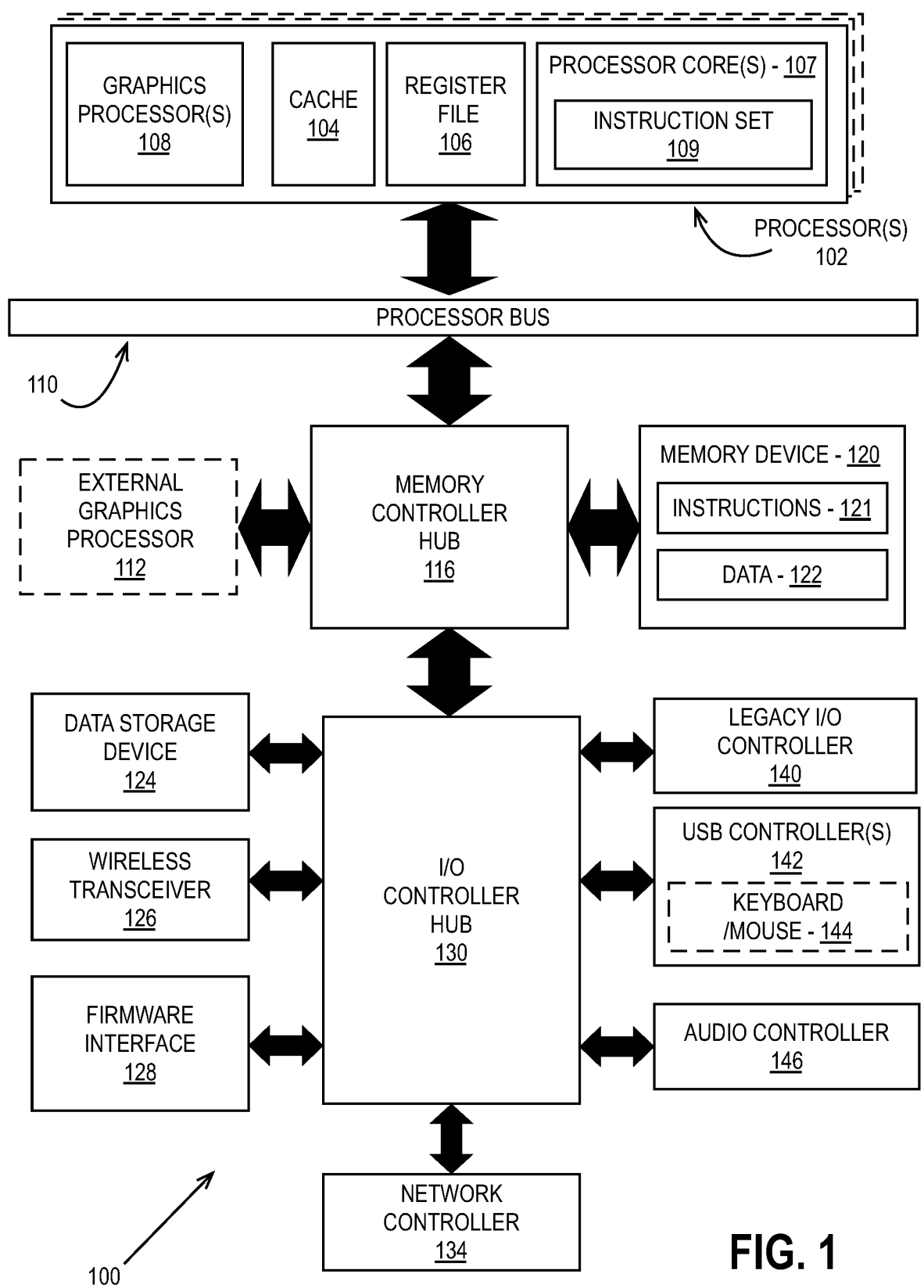
FIG. 1 is a block diagram of an embodiment of a computer system with a processor having one or more processor cores and graphics processors.

FIG. 1 is a block diagram of a processing system 100, according to an embodiment. In various embodiments the system 100 includes one or more processors 102 and one or more graphics processors 108, and may be a single processor desktop system, a multiprocessor workstation system, or a server system having a large number of processors 102 or processor cores 107. In on embodiment, the system 100 is a processing platform incorporated within a system-on-a-chip (SoC) integrated circuit for use in mobile, handheld, or embedded devices.

An embodiment of system 100 can include, or be incorporated within a server-based gaming platform, a game console, including a game and media console, a mobile gaming console, a handheld game console, or an online game console. In some embodiments system 100 is a mobile phone, smart phone, tablet computing device or mobile Internet device. Data processing system 100 can also include, couple with, or be integrated within a wearable device, such as a smart watch wearable device, smart eyewear device, augmented reality device, or virtual reality device. In some embodiments, data processing system 100 is a television or set top box device having one or more processors 102 and a graphical interface generated by one or more graphics processors 108.

In some embodiments, the one or more processors 102 each include one or more processor cores 107 to process instructions which, when executed, perform operations for system and user software. In some embodiments, each of the one or more processor cores 107 is configured to process a specific instruction set 109. In some embodiments, instruction set 109 may facilitate Complex Instruction Set Computing (CISC), Reduced Instruction Set Computing (RISC), or computing via a Very Long Instruction Word (VLIW). Multiple processor cores 107 may each process a different instruction set 109, which may include instructions to facilitate the emulation of other instruction sets. Processor core 107 may also include other processing devices, such a Digital Signal Processor (DSP).

In some embodiments, the processor 102 includes cache memory 104. Depending on the architecture, the processor 102 can have a single internal cache or multiple levels of internal cache. In some embodiments, the cache memory is shared among various components of the processor 102. In some embodiments, the processor 102 also uses an external cache (e.g., a Level-3 (L3) cache or Last Level Cache (LLC)) (not shown), which may be shared among processor cores 107 using known cache coherency techniques. A register file 106 is additionally included in processor 102 which may include different types of registers for storing different types of data (e.g., integer registers, floating point registers, status registers, and an instruction pointer register). Some registers may be general-purpose registers, while other registers may be specific to the design of the processor 102.

In some embodiments, processor 102 is coupled to a processor bus 110 to transmit communication signals such as address, data, or control signals between processor 102 and other components in system 100. In one embodiment the system 100 uses an exemplary 'hub' system architecture, including a memory controller hub 116 and an Input Output (I/O) controller hub 130. A memory controller hub 116 facilitates communication between a memory device and other components of system 100, while the I/O Controller Hub (ICH) 130 provides connections to I/O devices via a local I/O bus. In one embodiment, the logic of the memory controller hub 116 is integrated within the processor.

Memory device 120 can be a dynamic random access memory (DRAM) device, a static random access memory (SRAM) device, flash memory device, phase-change memory device, or some other memory device having suitable performance to serve as process memory. In one embodiment the memory device 120 can operate as system memory for the system 100, to store data 122 and instructions 121 for use when the one or more processors 102 executes an application or process. Memory controller hub 116 also couples with an optional external graphics processor 112, which may communicate with the one or more graphics processors 108 in processors 102 to perform graphics and media operations.

In some embodiments, ICH 130 enables peripherals to connect to memory device 120 and processor 102 via a high-speed I/O bus. The I/O peripherals include, but are not limited to, an audio controller 146, a firmware interface 128, a wireless transceiver 126 (e.g., Wi-Fi, Bluetooth), a data storage device 124 (e.g., hard disk drive, flash memory, etc.), and a legacy I/O controller 140 for coupling legacy (e.g., Personal System 2 (PS/2)) devices to the system. One or more Universal Serial Bus (USB) controllers 142 connect input devices, such as keyboard and mouse 144 combinations. A network controller 134 may also couple to ICH 130. In some embodiments, a high-performance network controller (not shown) couples to processor bus 110. It will be appreciated that the system 100 shown is exemplary and not limiting, as other types of data processing systems that are differently configured may also be used. For example, the I/O controller hub 130 may be integrated within the one or more processor 102, or the memory controller hub 116 and I/O controller hub 130 may be integrated into a discreet external graphics processor, such as the external graphics processor 112.

Figure 2:
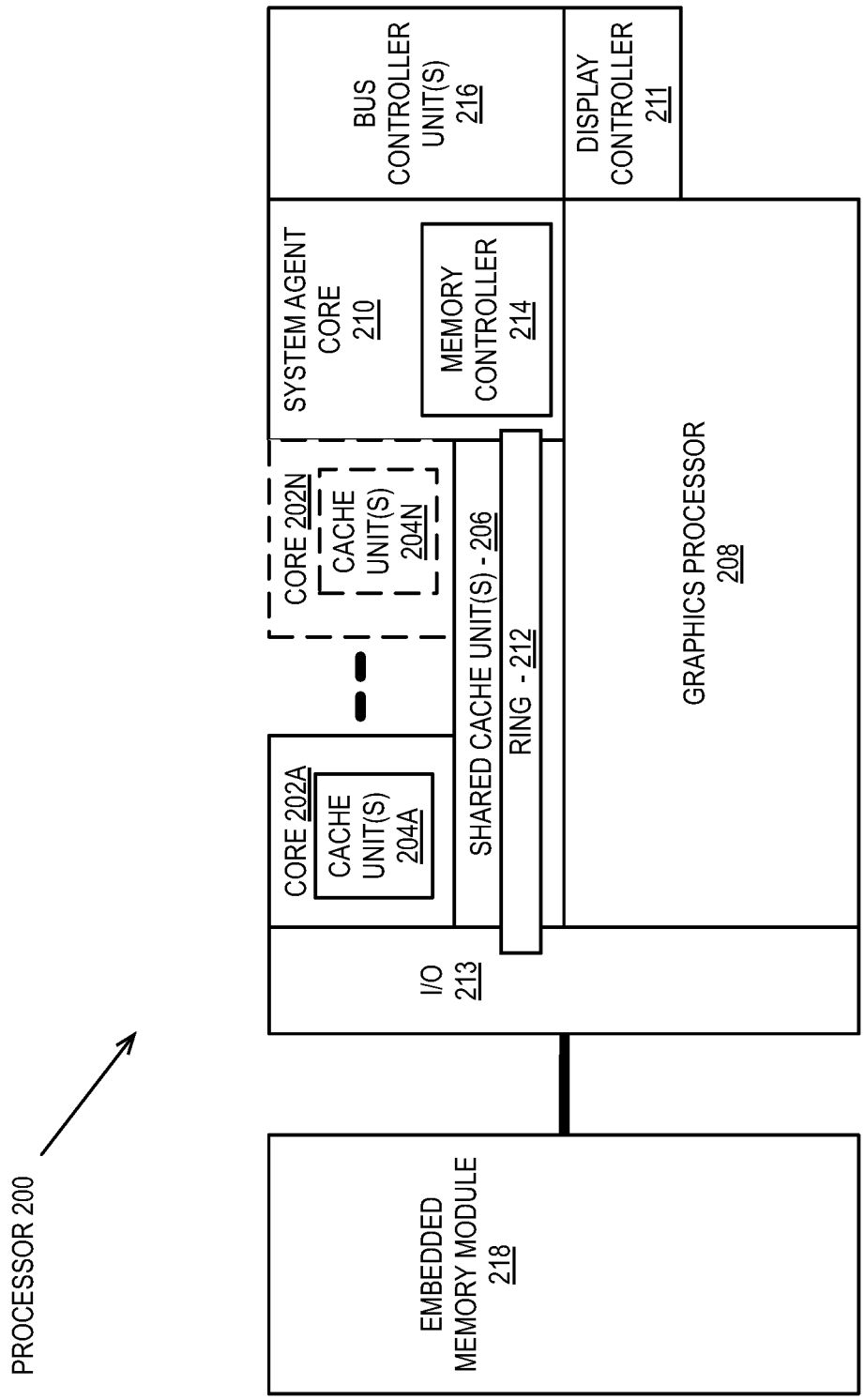
FIG. 2 is a block diagram of one embodiment of a processor having one or more processor cores, an integrated memory controller, and an integrated graphics processor.

FIG. 2 is a block diagram of an embodiment of a processor 200 having one or more processor cores 202A-202N, an integrated memory controller 214, and an integrated graphics processor 208. Those elements of FIG. 2 having the same reference numbers (or names) as the elements of any other figure herein can operate or function in any manner similar to that described elsewhere herein, but are not limited to such. Processor 200 can include additional cores up to and including additional core 202N represented by the dashed lined boxes. Each of processor cores 202A-202N includes one or more internal cache units 204A-204N.

In some embodiments each processor core also has access to one or more shared cached units 206. The internal cache units 204A-204N and shared cache units 206 represent a cache memory hierarchy within the processor 200. The cache memory hierarchy may include at least one level of instruction and data cache within each processor core and one or more levels of shared mid-level cache, such as a Level 2 (L2), Level 3 (L3), Level 4 (L4), or other levels of cache, where the highest level of cache before external memory is classified as the LLC. In some embodiments, cache coherency logic maintains coherency between the various cache units 206 and 204A-204N.

In some embodiments, processor 200 may also include a set of one or more bus controller units 216 and a system agent core 210. The one or more bus controller units 216 manage a set of peripheral buses, such as one or more Peripheral Component Interconnect buses (e.g., PCI, PCI Express). System agent core 210 provides management functionality for the various processor components. In some embodiments, system agent core 210 includes one or more integrated memory controllers 214 to manage access to various external memory devices (not shown).

In some embodiments, one or more of the processor cores 202A-202N include support for simultaneous multi-threading. In such embodiment, the system agent core 210 includes components for coordinating and operating cores 202A-202N during multi-threaded processing. System agent core 210 may additionally include a power control unit (PCU), which includes logic and components to regulate the power state of processor cores 202A-202N and graphics processor 208.

In some embodiments, processor 200 additionally includes graphics processor 208 to execute graphics processing operations. In some embodiments, the graphics processor 208 couples with the set of shared cache units 206, and the system agent core 210, including the one or more integrated memory controllers 214. In some embodiments, a display controller 211 is coupled with the graphics processor 208 to drive graphics processor output to one or more coupled displays. In some embodiments, display controller 211 may be a separate module coupled with the graphics processor via at least one interconnect, or may be integrated within the graphics processor 208 or system agent core 210.

In some embodiments, a ring based interconnect unit 212 is used to couple the internal components of the processor 200. However, an alternative interconnect unit may be used, such as a point-to-point interconnect, a switched interconnect, or other techniques, including techniques well known in the art. In some embodiments, graphics processor 208 couples with the ring interconnect 212 via an I/O link 213.

The exemplary I/O link 213 represents at least one of multiple varieties of I/O interconnects, including an on package I/O interconnect which facilitates communication between various processor components and a high-performance embedded memory module 218, such as an eDRAM module. In some embodiments, each of the processor cores 202-202N and graphics processor 208 use embedded memory modules 218 as a shared Last Level Cache.

In some embodiments, processor cores 202A-202N are homogenous cores executing the same instruction set architecture. In another embodiment, processor cores 202A-202N are heterogeneous in terms of instruction set architecture (ISA), where one or more of processor cores 202A-N execute a first instruction set, while at least one of the other cores executes a subset of the first instruction set or a different instruction set. In one embodiment processor cores 202A-202N are heterogeneous in terms of microarchitecture, where one or more cores having a relatively higher power consumption couple with one or more power cores having a lower power consumption. Additionally, processor 200 can be implemented on one or more chips or as an SoC integrated circuit having the illustrated components, in addition to other components.

Figure 3:
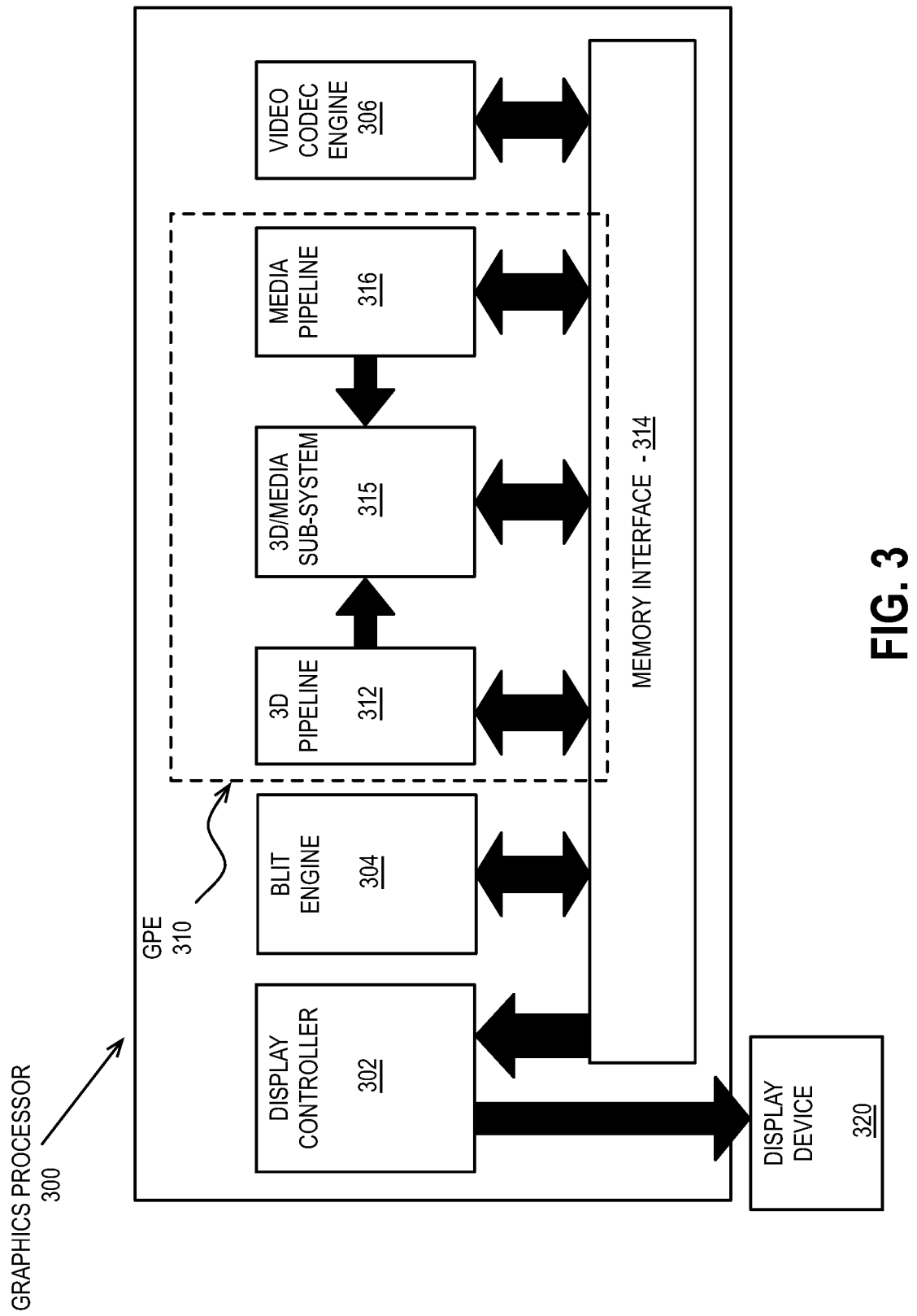
FIG. 3 is a block diagram of one embodiment of a graphics processor which may be a discreet graphics processing unit, or may be graphics processor integrated with a plurality of processing cores.

FIG. 3 is a block diagram of a graphics processor 300, which may be a discrete graphics processing unit, or may be a graphics processor integrated with a plurality of processing cores. In some embodiments, the graphics processor communicates via a memory mapped I/O interface to registers on the graphics processor and with commands placed into the processor memory. In some embodiments, graphics processor 300 includes a memory interface 314 to access memory. Memory interface 314 can be an interface to local memory, one or more internal caches, one or more shared external caches, and/or to system memory.

In some embodiments, graphics processor 300 also includes a display controller 302 to drive display output data to a display device 320. Display controller 302 includes hardware for one or more overlay planes for the display and composition of multiple layers of video or user interface elements. In some embodiments, graphics processor 300 includes a video codec engine 306 to encode, decode, or transcode media to, from, or between one or more media encoding formats, including, but not limited to Moving Picture Experts Group (MPEG) formats such as MPEG-2, Advanced Video Coding (AVC) formats such as H.264/MPEG-4 AVC, as well as the Society of Motion Picture & Television Engineers (SMPTE) 421M/VC-1, and Joint Photographic Experts Group (JPEG) formats such as JPEG, and Motion JPEG (MJPEG) formats.

In some embodiments, graphics processor 300 includes a block image transfer (BLIT) engine 304 to perform two-dimensional (2D) rasterizer operations including, for example, bit-boundary block transfers. However, in one embodiment, 2D graphics operations are performed using one or more components of graphics processing engine (GPE) 310. In some embodiments, graphics processing engine 310 is a compute engine for performing graphics operations, including three-dimensional (3D) graphics operations and media operations.

In some embodiments, GPE 310 includes a 3D pipeline 312 for performing 3D operations, such as rendering three-dimensional images and scenes using processing functions that act upon 3D primitive shapes (e.g., rectangle, triangle, etc.). The 3D pipeline 312 includes programmable and fixed function elements that perform various tasks within the element and/or spawn execution threads to a 3D/Media sub-system 315. While 3D pipeline 312 can be used to perform media operations, an embodiment of GPE 310 also includes a media pipeline 316 that is specifically used to perform media operations, such as video post-processing and image enhancement.

In some embodiments, media pipeline 316 includes fixed function or programmable logic units to perform one or more specialized media operations, such as video decode acceleration, video de-interlacing, and video encode acceleration in place of, or on behalf of video codec engine 306. In some embodiments, media pipeline 316 additionally includes a thread spawning unit to spawn threads for execution on 3D/Media sub-system 315. The spawned threads perform computations for the media operations on one or more graphics execution units included in 3D/Media sub-system 315.

In some embodiments, 3D/Media subsystem 315 includes logic for executing threads spawned by 3D pipeline 312 and media pipeline 316. In one embodiment, the pipelines send thread execution requests to 3D/Media subsystem 315, which includes thread dispatch logic for arbitrating and dispatching the various requests to available thread execution resources. The execution resources include an array of graphics execution units to process the 3D and media threads. In some embodiments, 3D/Media subsystem 315 includes one or more internal caches for thread instructions and data. In some embodiments, the subsystem also includes shared memory, including registers and addressable memory, to share data between threads and to store output data.

3D/Media Processing

Figure 4:
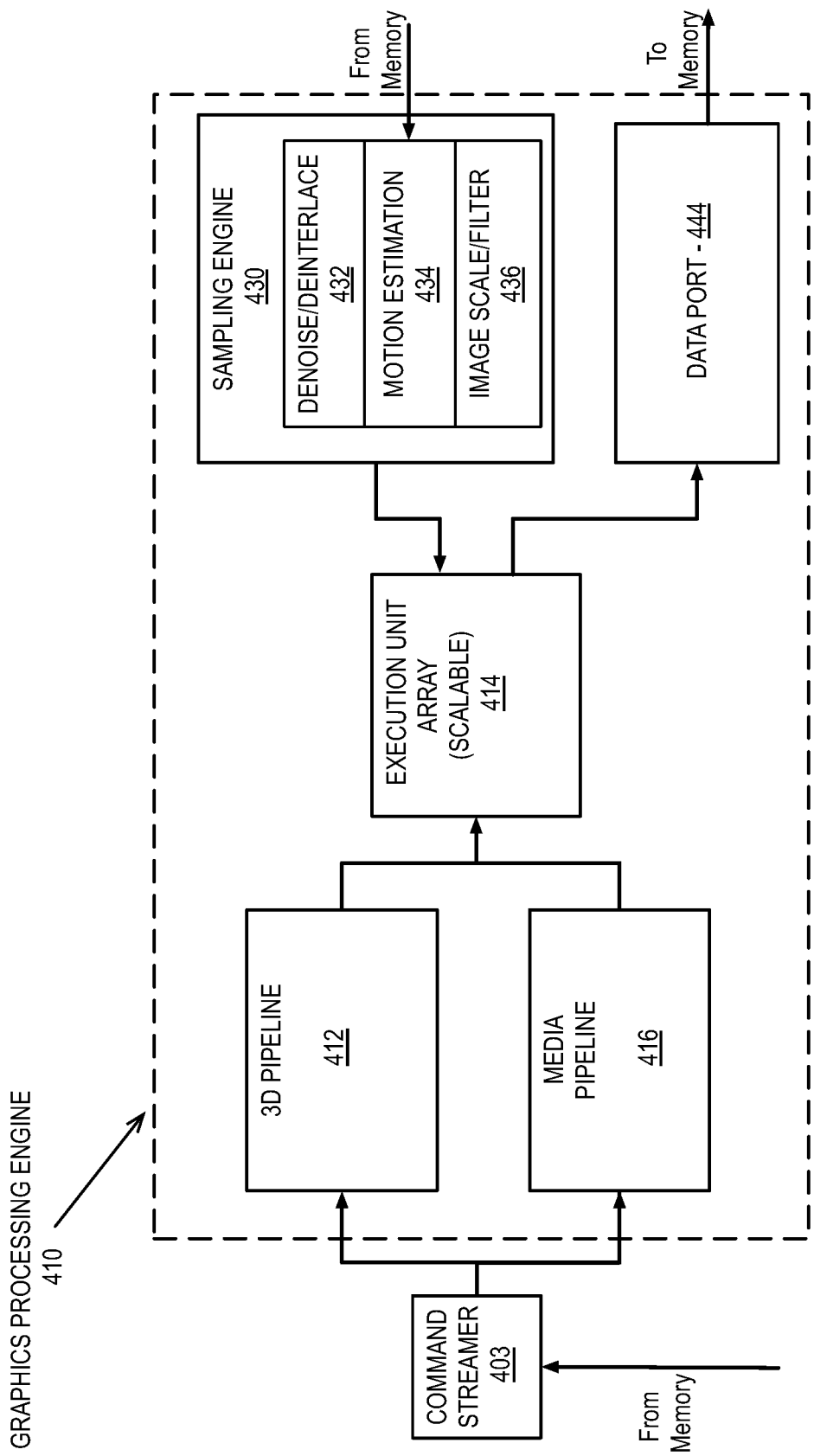
FIG. 4 is a block diagram of an embodiment of a graphics processing engine for a graphics processor.

FIG. 4 is a block diagram of a graphics processing engine 410 of a graphics processor in accordance with some embodiments. In one embodiment, the GPE 410 is a version of the GPE 310 shown in FIG. 3. Elements of FIG. 4 having the same reference numbers (or names) as the elements of any other figure herein can operate or function in any manner similar to that described elsewhere herein, but are not limited to such.

In some embodiments, GPE 410 couples with a command streamer 403, which provides a command stream to the GPE 3D and media pipelines 412, 416. In some embodiments, command streamer 403 is coupled to memory, which can be system memory, or one or more of internal cache memory and shared cache memory. In some embodiments, command streamer 403 receives commands from the memory and sends the commands to 3D pipeline 412 and/or media pipeline 416. The commands are directives fetched from a ring buffer, which stores commands for the 3D and media pipelines 412, 416. In one embodiment, the ring buffer can additionally include batch command buffers storing batches of multiple commands. The 3D and media pipelines 412, 416 process the commands by performing operations via logic within the respective pipelines or by dispatching one or more execution threads to an execution unit array 414. In some embodiments, execution unit array 414 is scalable, such that the array includes a variable number of execution units based on the target power and performance level of GPE 410.

In some embodiments, a sampling engine 430 couples with memory (e.g., cache memory or system memory) and execution unit array 414. In some embodiments, sampling engine 430 provides a memory access mechanism for execution unit array 414 that allows execution array 414 to read graphics and media data from memory. In some embodiments, sampling engine 430 includes logic to perform specialized image sampling operations for media.

In some embodiments, the specialized media sampling logic in sampling engine 430 includes a de-noise/de-interlace module 432, a motion estimation module 434, and an image scaling and filtering module 436. In some embodiments, de-noise/de-interlace module 432 includes logic to perform one or more of a de-noise or a de-interlace algorithm on decoded video data. The de-interlace logic combines alternating fields of interlaced video content into a single fame of video. The de-noise logic reduces or removes data noise from video and image data. In some embodiments, the de-noise logic and de-interlace logic are motion adaptive and use spatial or temporal filtering based on the amount of motion detected in the video data. In some embodiments, the de-noise/de-interlace module 432 includes dedicated motion detection logic (e.g., within the motion estimation engine 434).

In some embodiments, motion estimation engine 434 provides hardware acceleration for video operations by performing video acceleration functions such as motion vector estimation and prediction on video data. The motion estimation engine determines motion vectors that describe the transformation of image data between successive video frames. In some embodiments, a graphics processor media codec uses video motion estimation engine 434 to perform operations on video at the macro-block level that may otherwise be too computationally intensive to perform with a general-purpose processor. In some embodiments, motion estimation engine 434 is generally available to graphics processor components to assist with video decode and processing functions that are sensitive or adaptive to the direction or magnitude of the motion within video data.

In some embodiments, image scaling and filtering module 436 performs image-processing operations to enhance the visual quality of generated images and video. In some embodiments, scaling and filtering module 436 processes image and video data during the sampling operation before providing the data to execution unit array 414.

In some embodiments, the GPE 410 includes a data port 444, which provides an additional mechanism for graphics subsystems to access memory. In some embodiments, data port 444 facilitates memory access for operations including render target writes, constant buffer reads, scratch memory space reads/writes, and media surface accesses. In some embodiments, data port 444 includes cache memory space to cache accesses to memory. The cache memory can be a single data cache or separated into multiple caches for the multiple subsystems that access memory via the data port (e.g., a render buffer cache, a constant buffer cache, etc.). In some embodiments, threads executing on an execution unit in execution unit array 414 communicate with the data port by exchanging messages via a data distribution interconnect that couples each of the sub-systems of GPE 410.

Execution Units

Figure 5:
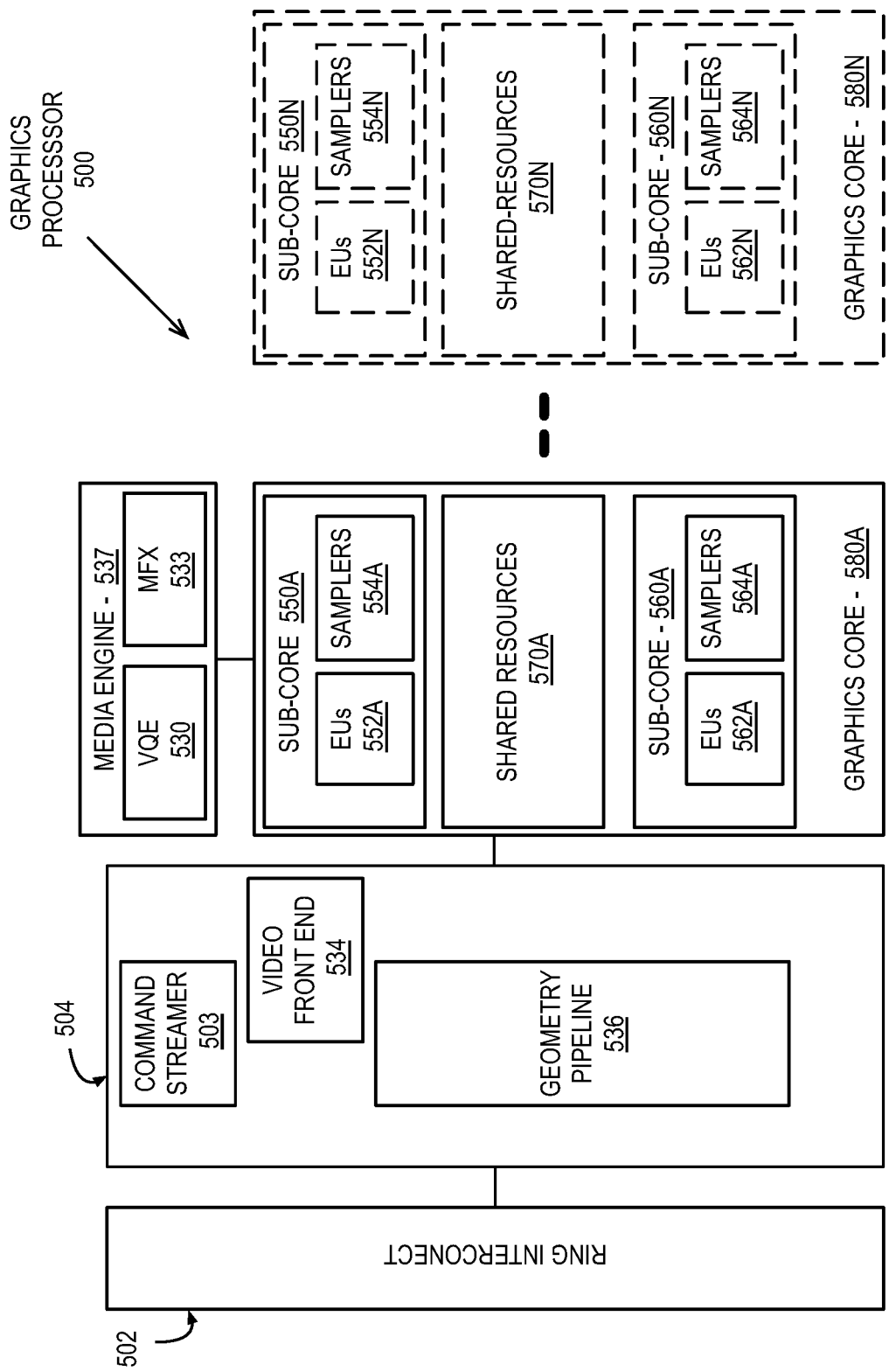
FIG. 5 is a block diagram of another embodiment of a graphics processor.

FIG. 5 is a block diagram of another embodiment of a graphics processor 500. Elements of FIG. 5 having the same reference numbers (or names) as the elements of any other figure herein can operate or function in any manner similar to that described elsewhere herein, but are not limited to such.

In some embodiments, graphics processor 500 includes a ring interconnect 502, a pipeline front-end 504, a media engine 537, and graphics cores 580A-580N. In some embodiments, ring interconnect 502 couples the graphics processor to other processing units, including other graphics processors or one or more general-purpose processor cores. In some embodiments, the graphics processor is one of many processors integrated within a multi-core processing system.

In some embodiments, graphics processor 500 receives batches of commands via ring interconnect 502. The incoming commands are interpreted by a command streamer 503 in the pipeline front-end 504. In some embodiments, graphics processor 500 includes scalable execution logic to perform 3D geometry processing and media processing via the graphics core(s) 580A-580N. For 3D geometry processing commands, command streamer 503 supplies commands to geometry pipeline 536. For at least some media processing commands, command streamer 503 supplies the commands to a video front end 534, which couples with a media engine 537. In some embodiments, media engine 537 includes a Video Quality Engine (VQE) 530 for video and image post-processing and a multi-format encode/decode (MFX) 533 engine to provide hardware-accelerated media data encode and decode. In some embodiments, geometry pipeline 536 and media engine 537 each generate execution threads for the thread execution resources provided by at least one graphics core 580A.

In some embodiments, graphics processor 500 includes scalable thread execution featuring modular cores 580A-580N (sometimes referred to as core slices), each having multiple sub-cores 550A-550N, 560A-560N (sometimes referred to as core sub-slices). In some embodiments, graphics processor 500 can have any number of graphics cores 580A through 580N. In some embodiments, graphics processor 500 includes a graphics core 580A having at least a first sub-core 550A and a second core sub-core 560A. In other embodiments, the graphics processor is a low power processor with a single sub-core (e.g., 550A). In some embodiments, graphics processor 500 includes multiple graphics cores 580A-580N, each including a set of first sub-cores 550A-550N and a set of second sub-cores 560A-560N. Each sub-core in the set of first sub-cores 550A-550N includes at least a first set of execution units 552A-552N and media/texture samplers 554A-554N. Each sub-core in the set of second sub-cores 560A-560N includes at least a second set of execution units 562A-562N and samplers 564A-564N. In some embodiments, each sub-core 550A-550N, 560A-560N shares a set of shared resources 570A-570N. In some embodiments, the shared resources include shared cache memory and pixel operation logic. Other shared resources may also be included in the various embodiments of the graphics processor.

Figure 6:
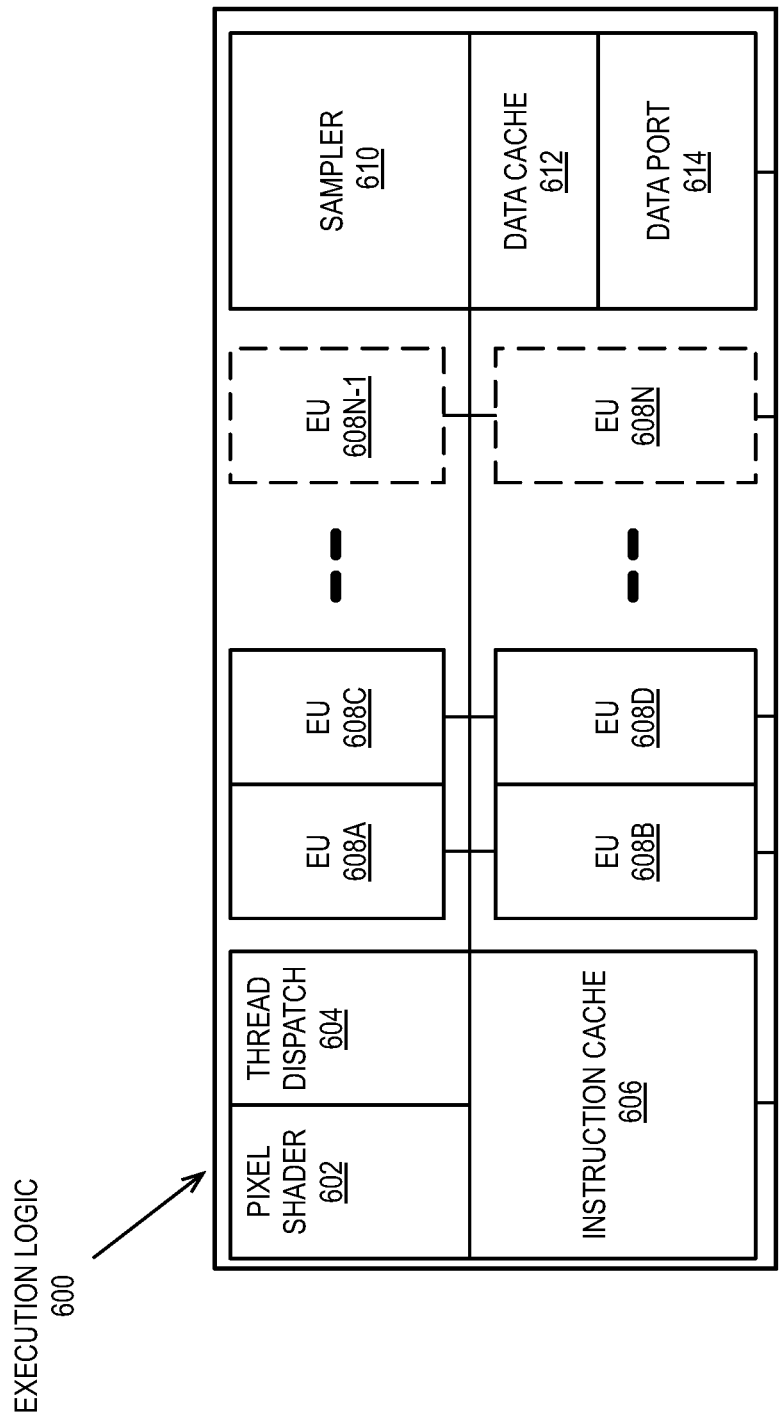
FIG. 6 is a block diagram of thread execution logic including an array of processing elements.

FIG. 6 illustrates thread execution logic 600 including an array of processing elements employed in some embodiments of a GPE. Elements of FIG. 6 having the same reference numbers (or names) as the elements of any other figure herein can operate or function in any manner similar to that described elsewhere herein, but are not limited to such.

In some embodiments, thread execution logic 600 includes a pixel shader 602, a thread dispatcher 604, instruction cache 606, a scalable execution unit array including a plurality of execution units 608A-608N, a sampler 610, a data cache 612, and a data port 614. In one embodiment the included components are interconnected via an interconnect fabric that links to each of the components. In some embodiments, thread execution logic 600 includes one or more connections to memory, such as system memory or cache memory, through one or more of instruction cache 606, data port 614, sampler 610, and execution unit array 608A-608N. In some embodiments, each execution unit (e.g. 608A) is an individual vector processor capable of executing multiple simultaneous threads and processing multiple data elements in parallel for each thread. In some embodiments, execution unit array 608A-608N includes any number individual execution units.

In some embodiments, execution unit array 608A-608N is primarily used to execute "shader" programs. In some embodiments, the execution units in array 608A-608N execute an instruction set that includes native support for many standard 3D graphics shader instructions, such that shader programs from graphics libraries (e.g., Direct 3D and OpenGL) are executed with a minimal translation. The execution units support vertex and geometry processing (e.g., vertex programs, geometry programs, vertex shaders), pixel processing (e.g., pixel shaders, fragment shaders) and general-purpose processing (e.g., compute and media shaders).

Each execution unit in execution unit array 608A-608N operates on arrays of data elements. The number of data elements is the "execution size," or the number of channels for the instruction. An execution channel is a logical unit of execution for data element access, masking, and flow control within instructions. The number of channels may be independent of the number of physical Arithmetic Logic Units (ALUs) or Floating Point Units (FPUs) for a particular graphics processor. In some embodiments, execution units 608A-608N support integer and floating-point data types.

The execution unit instruction set includes single instruction multiple data (SIMD) instructions. The various data elements can be stored as a packed data type in a register and the execution unit will process the various elements based on the data size of the elements. For example, when operating on a 256-bit wide vector, the 256 bits of the vector are stored in a register and the execution unit operates on the vector as four separate 64-bit packed data elements (Quad-Word (QW) size data elements), eight separate 32-bit packed data elements (Double Word (DW) size data elements), sixteen separate 16-bit packed data elements (Word (W) size data elements), or thirty-two separate 8-bit data elements (byte (B) size data elements). However, different vector widths and register sizes are possible.

One or more internal instruction caches (e.g., 606) are included in the thread execution logic 600 to cache thread instructions for the execution units. In some embodiments, one or more data caches (e.g., 612) are included to cache thread data during thread execution. In some embodiments, sampler 610 is included to provide texture sampling for 3D operations and media sampling for media operations. In some embodiments, sampler 610 includes specialized texture or media sampling functionality to process texture or media data during the sampling process before providing the sampled data to an execution unit.

During execution, the graphics and media pipelines send thread initiation requests to thread execution logic 600 via thread spawning and dispatch logic. In some embodiments, thread execution logic 600 includes a local thread dispatcher 604 that arbitrates thread initiation requests from the graphics and media pipelines and instantiates the requested threads on one or more execution units 608A-608N. For example, the geometry pipeline (e.g., 536 of FIG. 5) dispatches vertex processing, tessellation, or geometry processing threads to thread execution logic 600 (FIG. 6). In some embodiments, thread dispatcher 604 can also process runtime thread spawning requests from the executing shader programs.

Once a group of geometric objects has been processed and rasterized into pixel data, pixel shader 602 is invoked to further compute output information and cause results to be written to output surfaces (e.g., color buffers, depth buffers, stencil buffers, etc.). In some embodiments, pixel shader 602 calculates the values of the various vertex attributes that are to be interpolated across the rasterized object. In some embodiments, pixel shader 602 then executes an application programming interface (API)-supplied pixel shader program. To execute the pixel shader program, pixel shader 602 dispatches threads to an execution unit (e.g., 608A) via thread dispatcher 604. In some embodiments, pixel shader 602 uses texture sampling logic in sampler 610 to access texture data in texture maps stored in memory. Arithmetic operations on the texture data and the input geometry data compute pixel color data for each geometric fragment, or discards one or more pixels from further processing.

In some embodiments, the data port 614 provides a memory access mechanism for the thread execution logic 600 output processed data to memory for processing on a graphics processor output pipeline. In some embodiments, the data port 614 includes or couples to one or more cache memories (e.g., data cache 612) to cache data for memory access via the data port.

FIG. 7 is a block diagram illustrating a graphics processor instruction formats 700 according to some embodiments. In one or more embodiment, the graphics processor execution units support an instruction set having instructions in multiple formats. The solid lined boxes illustrate the components that are generally included in an execution unit instruction, while the dashed lines include components that are optional or that are only included in a sub-set of the instructions. In some embodiments, instruction format 700 described and illustrated are macro-instructions, in that they are instructions supplied to the execution unit, as opposed to micro-operations resulting from instruction decode once the instruction is processed.

In some embodiments, the graphics processor execution units natively support instructions in a 128-bit format 710. A 64-bit compacted instruction format 730 is available for some instructions based on the selected instruction, instruction options, and number of operands. The native 128-bit format 710 provides access to all instruction options, while some options and operations are restricted in the 64-bit format 730. The native instructions available in the 64-bit format 730 vary by embodiment. In some embodiments, the instruction is compacted in part using a set of index values in an index field 713. The execution unit hardware references a set of compaction tables based on the index values and uses the compaction table outputs to reconstruct a native instruction in the 128-bit format 710.

For each format, instruction opcode 712 defines the operation that the execution unit is to perform. The execution units execute each instruction in parallel across the multiple data elements of each operand. For example, in response to an add instruction the execution unit performs a simultaneous add operation across each color channel representing a texture element or picture element. By default, the execution unit performs each instruction across all data channels of the operands. In some embodiments, instruction control field 714 enables control over certain execution options, such as channels selection (e.g., predication) and data channel order (e.g., swizzle). For 128-bit instructions 710 an exec-size field 716 limits the number of data channels that will be executed in parallel. In some embodiments, exec-size field 716 is not available for use in the 64-bit compact instruction format 730.

Some execution unit instructions have up to three operands including two source operands, src0 720, src1 722, and one destination 718. In some embodiments, the execution units support dual destination instructions, where one of the destinations is implied. Data manipulation instructions can have a third source operand (e.g., SRC2 724), where the instruction opcode 712 determines the number of source operands. An instruction's last source operand can be an immediate (e.g., hard-coded) value passed with the instruction.

In some embodiments, the 128-bit instruction format 710 includes an access/address mode information 726 specifying, for example, whether direct register addressing mode or indirect register addressing mode is used. When direct register addressing mode is used, the register address of one or more operands is directly provided by bits in the instruction 710.

In some embodiments, the 128-bit instruction format 710 includes an access/address mode field 726, which specifies an address mode and/or an access mode for the instruction. In one embodiment the access mode to define a data access alignment for the instruction. Some embodiments support access modes including a 16-byte aligned access mode and a 1-byte aligned access mode, where the byte alignment of the access mode determines the access alignment of the instruction operands. For example, when in a first mode, the instruction 710 may use byte-aligned addressing for source and destination operands and when in a second mode, the instruction 710 may use 16-byte-aligned addressing for all source and destination operands.

In one embodiment, the address mode portion of the access/address mode field 726 determines whether the instruction is to use direct or indirect addressing. When direct register addressing mode is used bits in the instruction 710 directly provide the register address of one or more operands. When indirect register addressing mode is used, the register address of one or more operands may be computed based on an address register value and an address immediate field in the instruction.

In some embodiments instructions are grouped based on opcode 712 bit-fields to simplify Opcode decode 740. For an 8-bit opcode, bits 4, 5, and 6 allow the execution unit to determine the type of opcode. The precise opcode grouping shown is merely an example. In some embodiments, a move and logic opcode group 742 includes data movement and logic instructions (e.g., move (mov), compare (cmp)). In some embodiments, move and logic group 742 shares the five most significant bits (MSB), where move (mov) instructions are in the form of 0000xxxxb and logic instructions are in the form of 0001xxxxb. A flow control instruction group 744 (e.g., call, jump (jmp)) includes instructions in the form of 0010xxxxb (e.g., 0x20). A miscellaneous instruction group 746 includes a mix of instructions, including synchronization instructions (e.g., wait, send) in the form of 0011xxxxb (e.g., 0x30). A parallel math instruction group 748 includes component-wise arithmetic instructions (e.g., add, multiply (mul)) in the form of 0100xxxxb (e.g., 0x40). The parallel math group 748 performs the arithmetic operations in parallel across data channels. The vector math group 750 includes arithmetic instructions (e.g., dp4) in the form of 0101xxxxb (e.g., 0x50). The vector math group performs arithmetic such as dot product calculations on vector operands.

Graphics Pipeline

Figure 8:
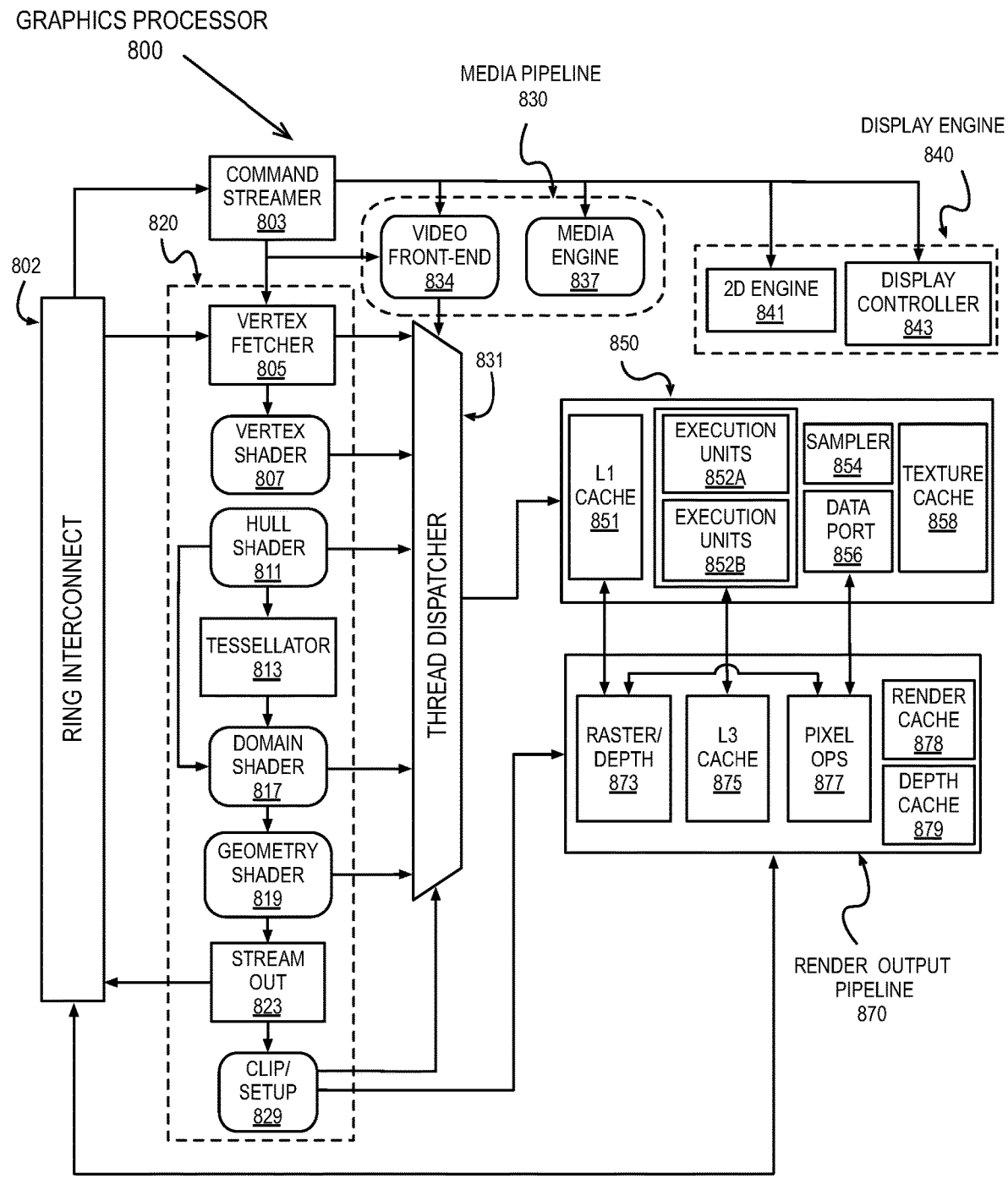
FIG. 8 is a block diagram of another embodiment of a graphics processor which includes a graphics pipeline, a media pipeline, a display engine, thread execution logic, and a render output pipeline.
Figure 9:
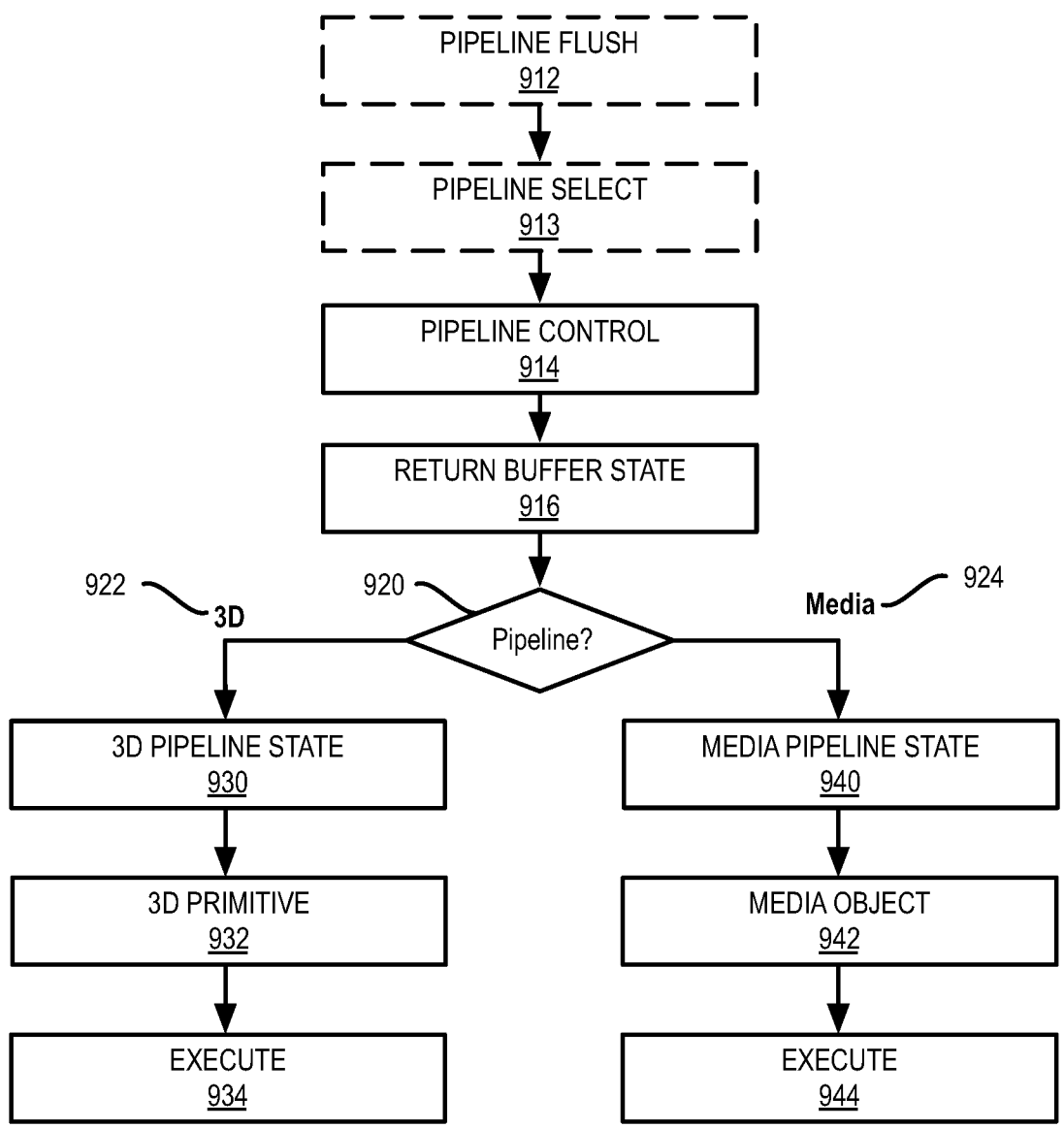
FIG. 9A is a block diagram illustrating a graphics processor command format according to an embodiment.
FIG. 9B is a block diagram illustrating a graphics processor command sequence according to an embodiment.

FIG. 8 is a block diagram of another embodiment of a graphics processor 800. Elements of FIG. 8 having the same reference numbers (or names) as the elements of any other figure herein can operate or function in any manner similar to that described elsewhere herein, but are not limited to such.

In some embodiments, graphics processor 800 includes a graphics pipeline 820, a media pipeline 830, a display engine 840, thread execution logic 850, and a render output pipeline 870. In some embodiments, graphics processor 800 is a graphics processor within a multi-core processing system that includes one or more general-purpose processing cores. The graphics processor is controlled by register writes to one or more control registers (not shown) or via commands issued to graphics processor 800 via a ring interconnect 802. In some embodiments, ring interconnect 802 couples graphics processor 800 to other processing components, such as other graphics processors or general-purpose processors. Commands from ring interconnect 802 are interpreted by a command streamer 803, which supplies instructions to individual components of graphics pipeline 820 or media pipeline 830.

In some embodiments, command streamer 803 directs the operation of a vertex fetcher 805 that reads vertex data from memory and executes vertex-processing commands provided by command streamer 803. In some embodiments, vertex fetcher 805 provides vertex data to a vertex shader 807, which performs coordinate space transformation and lighting operations to each vertex. In some embodiments, vertex fetcher 805 and vertex shader 807 execute vertex-processing instructions by dispatching execution threads to execution units 852A, 852B via a thread dispatcher 831.

In some embodiments, execution units 852A, 852B are an array of vector processors having an instruction set for performing graphics and media operations. In some embodiments, execution units 852A, 852B have an attached L1 cache 851 that is specific for each array or shared between the arrays. The cache can be configured as a data cache, an instruction cache, or a single cache that is partitioned to contain data and instructions in different partitions.

In some embodiments, graphics pipeline 820 includes tessellation components to perform hardware-accelerated tessellation of 3D objects. In some embodiments, a programmable hull shader 811 configures the tessellation operations. A programmable domain shader 817 provides back-end evaluation of tessellation output. A tessellator 813 operates at the direction of hull shader 811 and contains special purpose logic to generate a set of detailed geometric objects based on a coarse geometric model that is provided as input to graphics pipeline 820. In some embodiments, if tessellation is not used, tessellation components 811, 813, 817 can be bypassed.

In some embodiments, complete geometric objects can be processed by a geometry shader 819 via one or more threads dispatched to execution units 852A, 852B, or can proceed directly to the clipper 829. In some embodiments, the geometry shader operates on entire geometric objects, rather than vertices or patches of vertices as in previous stages of the graphics pipeline. If the tessellation is disabled the geometry shader 819 receives input from the vertex shader 807. In some embodiments, geometry shader 819 is programmable by a geometry shader program to perform geometry tessellation if the tessellation units are disabled.

Before rasterization, a clipper 829 processes vertex data. The clipper 829 may be a fixed function clipper or a programmable clipper having clipping and geometry shader functions. In some embodiments, a rasterizer and depth test component 873 in the render output pipeline 870 dispatches pixel shaders to convert the geometric objects into their per pixel representations. In some embodiments, pixel shader logic is included in thread execution logic 850. In some embodiments, an application can bypass the rasterizer 873 and access un-rasterized vertex data via a stream out unit 823.

The graphics processor 800 has an interconnect bus, interconnect fabric, or some other interconnect mechanism that allows data and message passing amongst the major components of the processor. In some embodiments, execution units 852A, 852B and associated cache(s) 851, texture and media sampler 854, and texture/sampler cache 858 interconnect via a data port 856 to perform memory access and communicate with render output pipeline components of the processor. In some embodiments, sampler 854, caches 851, 858 and execution units 852A, 852B each have separate memory access paths.

In some embodiments, render output pipeline 870 contains a rasterizer and depth test component 873 that converts vertex-based objects into an associated pixel-based representation. In some embodiments, the render output pipeline 870 includes a windower/masker unit to perform fixed function triangle and line rasterization. An associated render cache 878 and depth cache 879 are also available in some embodiments. A pixel operations component 877 performs pixel-based operations on the data, though in some instances, pixel operations associated with 2D operations (e.g. bit block image transfers with blending) are performed by the 2D engine 841, or substituted at display time by the display controller 843 using overlay display planes. In some embodiments, a shared L3 cache 875 is available to all graphics components, allowing the sharing of data without the use of main system memory.

In some embodiments, graphics processor media pipeline 830 includes a media engine 837 and a video front end 834. In some embodiments, video front end 834 receives pipeline commands from the command streamer 803. In some embodiments, media pipeline 830 includes a separate command streamer. In some embodiments, video front-end 834 processes media commands before sending the command to the media engine 837. In some embodiments, media engine 837 includes thread spawning functionality to spawn threads for dispatch to thread execution logic 850 via thread dispatcher 831.

In some embodiments, graphics processor 800 includes a display engine 840. In some embodiments, display engine 840 is external to processor 800 and couples with the graphics processor via the ring interconnect 802, or some other interconnect bus or fabric. In some embodiments, display engine 840 includes a 2D engine 841 and a display controller 843. In some embodiments, display engine 840 contains special purpose logic capable of operating independently of the 3D pipeline. In some embodiments, display controller 843 couples with a display device (not shown), which may be a system integrated display device, as in a laptop computer, or an external display device attached via a display device connector.

In some embodiments, graphics pipeline 820 and media pipeline 830 are configurable to perform operations based on multiple graphics and media programming interfaces and are not specific to any one application programming interface (API). In some embodiments, driver software for the graphics processor translates API calls that are specific to a particular graphics or media library into commands that can be processed by the graphics processor. In some embodiments, support is provided for the Open Graphics Library (OpenGL) and Open Computing Language (OpenCL) from the Khronos Group, the Direct3D library from the Microsoft Corporation, or support may be provided to both OpenGL and D3D. Support may also be provided for the Open Source Computer Vision Library (OpenCV). A future API with a compatible 3D pipeline would also be supported if a mapping can be made from the pipeline of the future API to the pipeline of the graphics processor.

Graphics Pipeline Programming

FIG. 9A is a block diagram illustrating a graphics processor command format 900 according to some embodiments. FIG. 9B is a block diagram illustrating a graphics processor command sequence 910 according to an embodiment. The solid lined boxes in FIG. 9A illustrate the components that are generally included in a graphics command while the dashed lines include components that are optional or that are only included in a sub-set of the graphics commands. The exemplary graphics processor command format 900 of FIG. 9A includes data fields to identify a target client 902 of the command, a command operation code (opcode) 904, and the relevant data 906 for the command. A sub-opcode 905 and a command size 908 are also included in some commands.

In some embodiments, client 902 specifies the client unit of the graphics device that processes the command data. In some embodiments, a graphics processor command parser examines the client field of each command to condition the further processing of the command and route the command data to the appropriate client unit. In some embodiments, the graphics processor client units include a memory interface unit, a render unit, a 2D unit, a 3D unit, and a media unit. Each client unit has a corresponding processing pipeline that processes the commands. Once the command is received by the client unit, the client unit reads the opcode 904 and, if present, sub-opcode 905 to determine the operation to perform. The client unit performs the command using information in data field 906. For some commands an explicit command size 908 is expected to specify the size of the command. In some embodiments, the command parser automatically determines the size of at least some of the commands based on the command opcode. In some embodiments commands are aligned via multiples of a double word.

The flow diagram in FIG. 9B shows an exemplary graphics processor command sequence 910. In some embodiments, software or firmware of a data processing system that features an embodiment of a graphics processor uses a version of the command sequence shown to set up, execute, and terminate a set of graphics operations. A sample command sequence is shown and described for purposes of example only as embodiments are not limited to these specific commands or to this command sequence. Moreover, the commands may be issued as batch of commands in a command sequence, such that the graphics processor will process the sequence of commands in at least partially concurrence.

In some embodiments, the graphics processor command sequence 910 may begin with a pipeline flush command 912 to cause any active graphics pipeline to complete the currently pending commands for the pipeline. In some embodiments, the 3D pipeline 922 and the media pipeline 924 do not operate concurrently. The pipeline flush is performed to cause the active graphics pipeline to complete any pending commands. In response to a pipeline flush, the command parser for the graphics processor will pause command processing until the active drawing engines complete pending operations and the relevant read caches are invalidated. Optionally, any data in the render cache that is marked 'dirty' can be flushed to memory. In some embodiments, pipeline flush command 912 can be used for pipeline synchronization or before placing the graphics processor into a low power state.

In some embodiments, a pipeline select command 913 is used when a command sequence requires the graphics processor to explicitly switch between pipelines. In some embodiments, a pipeline select command 913 is required only once within an execution context before issuing pipeline commands unless the context is to issue commands for both pipelines. In some embodiments, a pipeline flush command is 912 is required immediately before a pipeline switch via the pipeline select command 913.

In some embodiments, a pipeline control command 914 configures a graphics pipeline for operation and is used to program the 3D pipeline 922 and the media pipeline 924. In some embodiments, pipeline control command 914 configures the pipeline state for the active pipeline. In one embodiment, the pipeline control command 914 is used for pipeline synchronization and to clear data from one or more cache memories within the active pipeline before processing a batch of commands.

In some embodiments, return buffer state commands 916 are used to configure a set of return buffers for the respective pipelines to write data. Some pipeline operations require the allocation, selection, or configuration of one or more return buffers into which the operations write intermediate data during processing. In some embodiments, the graphics processor also uses one or more return buffers to store output data and to perform cross thread communication. In some embodiments, the return buffer state 916 includes selecting the size and number of return buffers to use for a set of pipeline operations.

The remaining commands in the command sequence differ based on the active pipeline for operations. Based on a pipeline determination 920, the command sequence is tailored to the 3D pipeline 922 beginning with the 3D pipeline state 930, or the media pipeline 924 beginning at the media pipeline state 940.

The commands for the 3D pipeline state 930 include 3D state setting commands for vertex buffer state, vertex element state, constant color state, depth buffer state, and other state variables that are to be configured before 3D primitive commands are processed. The values of these commands are determined at least in part based the particular 3D API in use. In some embodiments, 3D pipeline state 930 commands are also able to selectively disable or bypass certain pipeline elements if those elements will not be used.

In some embodiments, 3D primitive 932 command is used to submit 3D primitives to be processed by the 3D pipeline. Commands and associated parameters that are passed to the graphics processor via the 3D primitive 932 command are forwarded to the vertex fetch function in the graphics pipeline. The vertex fetch function uses the 3D primitive 932 command data to generate vertex data structures. The vertex data structures are stored in one or more return buffers. In some embodiments, 3D primitive 932 command is used to perform vertex operations on 3D primitives via vertex shaders. To process vertex shaders, 3D pipeline 922 dispatches shader execution threads to graphics processor execution units.

In some embodiments, 3D pipeline 922 is triggered via an execute 934 command or event. In some embodiments, a register write triggers command execution. In some embodiments execution is triggered via a 'go' or 'kick' command in the command sequence. In one embodiment command execution is triggered using a pipeline synchronization command to flush the command sequence through the graphics pipeline. The 3D pipeline will perform geometry processing for the 3D primitives. Once operations are complete, the resulting geometric objects are rasterized and the pixel engine colors the resulting pixels. Additional commands to control pixel shading and pixel back end operations may also be included for those operations.

In some embodiments, the graphics processor command sequence 910 follows the media pipeline 924 path when performing media operations. In general, the specific use and manner of programming for the media pipeline 924 depends on the media or compute operations to be performed. Specific media decode operations may be offloaded to the media pipeline during media decode. In some embodiments, the media pipeline can also be bypassed and media decode can be performed in whole or in part using resources provided by one or more general-purpose processing cores. In one embodiment, the media pipeline also includes elements for general-purpose graphics processor unit (GPGPU) operations, where the graphics processor is used to perform SIMD vector operations using computational shader programs that are not explicitly related to the rendering of graphics primitives.

In some embodiments, media pipeline 924 is configured in a similar manner as the 3D pipeline 922. A set of media pipeline state commands 940 are dispatched or placed into in a command queue before the media object commands 942. In some embodiments, media pipeline state commands 940 include data to configure the media pipeline elements that will be used to process the media objects. This includes data to configure the video decode and video encode logic within the media pipeline, such as encode or decode format. In some embodiments, media pipeline state commands 940 also support the use one or more pointers to "indirect" state elements that contain a batch of state settings.

In some embodiments, media object commands 942 supply pointers to media objects for processing by the media pipeline. The media objects include memory buffers containing video data to be processed. In some embodiments, all media pipeline states must be valid before issuing a media object command 942. Once the pipeline state is configured and media object commands 942 are queued, the media pipeline 924 is triggered via an execute command 944 or an equivalent execute event (e.g., register write). Output from media pipeline 924 may then be post processed by operations provided by the 3D pipeline 922 or the media pipeline 924. In some embodiments, GPGPU operations are configured and executed in a similar manner as media operations.

Graphics Software Architecture

Figure 10:
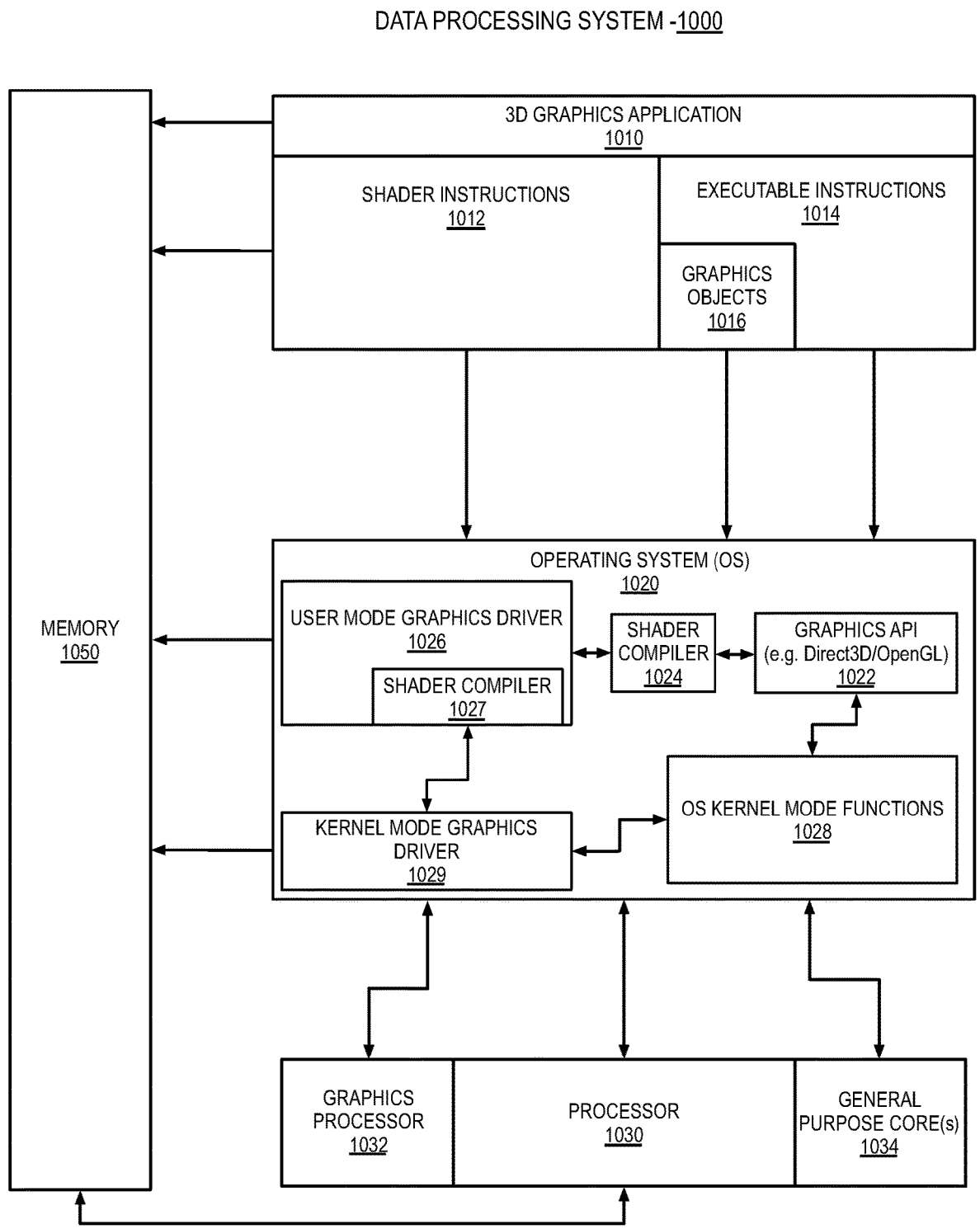
FIG. 10 illustrates exemplary graphics software architecture for a data processing system according to an embodiment.

FIG. 10 illustrates exemplary graphics software architecture for a data processing system 1000 according to some embodiments. In some embodiments, software architecture includes a 3D graphics application 1010, an operating system 1020, and at least one processor 1030. In some embodiments, processor 1030 includes a graphics processor 1032 and one or more general-purpose processor core(s) 1034. The graphics application 1010 and operating system 1020 each execute in the system memory 1050 of the data processing system.

In some embodiments, 3D graphics application 1010 contains one or more shader programs including shader instructions 1012. The shader language instructions may be in a high-level shader language, such as the High Level Shader Language (HLSL) or the OpenGL Shader Language (GLSL). The application also includes executable instructions 1014 in a machine language suitable for execution by the general-purpose processor core 1034. The application also includes graphics objects 1016 defined by vertex data.

In some embodiments, operating system 1020 is a Microsoft® Windows® operating system from the Microsoft Corporation, a proprietary UNIX-like operating system, or an open source UNIX-like operating system using a variant of the Linux kernel. The operating system 1020 can support a graphics API 1022 such as the Direct3D API or the OpenGL API. When the Direct3D API is in use, the operating system 1020 uses a front-end shader compiler 1024 to compile any shader instructions 1012 in HLSL into a lower-level shader language. The compilation may be a just-in-time (JIT) compilation or the application can perform shader pre-compilation. In some embodiments, high-level shaders are compiled into low-level shaders during the compilation of the 3D graphics application 1010.

In some embodiments, user mode graphics driver 1026 contains a back-end shader compiler 1027 to convert the shader instructions 1012 into a hardware specific representation. When the OpenGL API is in use, shader instructions 1012 in the GLSL high-level language are passed to a user mode graphics driver 1026 for compilation. In some embodiments, user mode graphics driver 1026 uses operating system kernel mode functions 1028 to communicate with a kernel mode graphics driver 1029. In some embodiments, kernel mode graphics driver 1029 communicates with graphics processor 1032 to dispatch commands and instructions.

IP Core Implementations

One or more aspects of at least one embodiment may be implemented by representative code stored on a machine-readable medium which represents and/or defines logic within an integrated circuit such as a processor. For example, the machine-readable medium may include instructions which represent various logic within the processor. When read by a machine, the instructions may cause the machine to fabricate the logic to perform the techniques described herein. Such representations, known as "IP cores," are reusable units of logic for an integrated circuit that may be stored on a tangible, machine-readable medium as a hardware model that describes the structure of the integrated circuit. The hardware model may be supplied to various customers or manufacturing facilities, which load the hardware model on fabrication machines that manufacture the integrated circuit. The integrated circuit may be fabricated such that the circuit performs operations described in association with any of the embodiments described herein.

Figure 11:
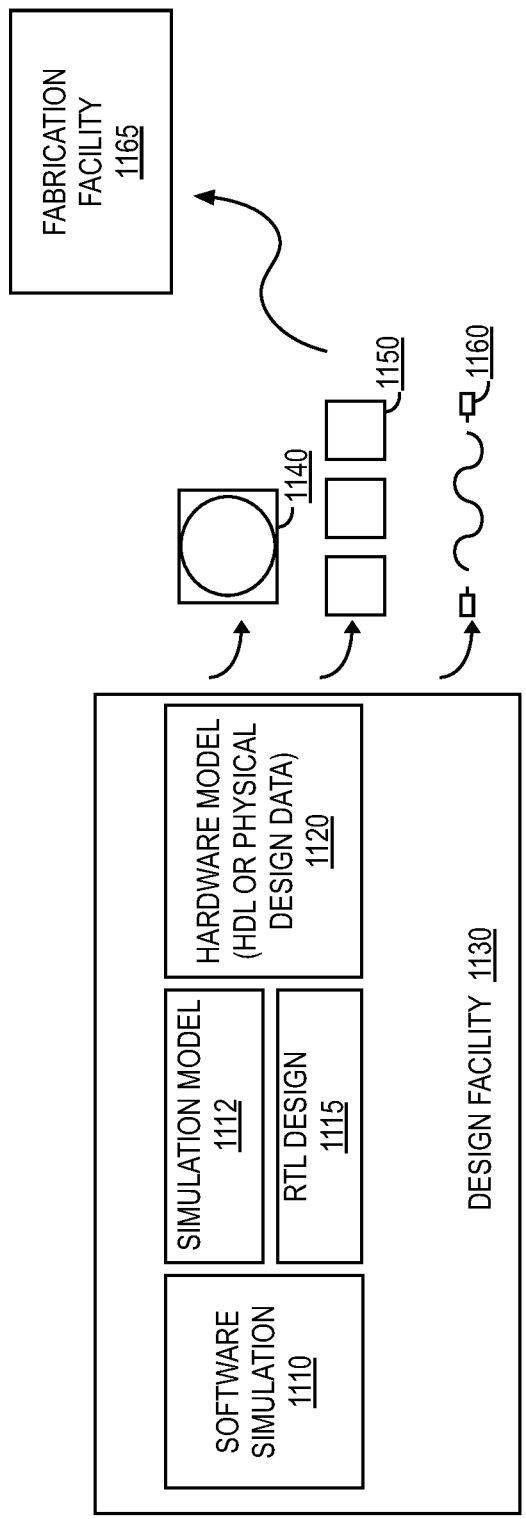
FIG. 11 is a block diagram illustrating an IP core development system that may be used to manufacture an integrated circuit to perform operations according to an embodiment.

FIG. 11 is a block diagram illustrating an IP core development system 1100 that may be used to manufacture an integrated circuit to perform operations according to an embodiment. The IP core development system 1100 may be used to generate modular, re-usable designs that can be incorporated into a larger design or used to construct an entire integrated circuit (e.g., an SOC integrated circuit). A design facility 1130 can generate a software simulation 1110 of an IP core design in a high level programming language (e.g., C/C++). The software simulation 1110 can be used to design, test, and verify the behavior of the IP core. A register transfer level (RTL) design can then be created or synthesized from the simulation model 1112. The RTL design 1115 is an abstraction of the behavior of the integrated circuit that models the flow of digital signals between hardware registers, including the associated logic performed using the modeled digital signals. In addition to an RTL design 1115, lower-level designs at the logic level or transistor level may also be created, designed, or synthesized. Thus, the particular details of the initial design and simulation may vary.

The RTL design 1115 or equivalent may be further synthesized by the design facility into a hardware model 1120, which may be in a hardware description language (HDL), or some other representation of physical design data. The HDL may be further simulated or tested to verify the IP core design. The IP core design can be stored for delivery to a $3^{rd}$ party fabrication facility 1165 using non-volatile memory 1140 (e.g., hard disk, flash memory, or any non-volatile storage medium). Alternatively, the IP core design may be transmitted (e.g., via the Internet) over a wired connection 1150 or wireless connection 1160. The fabrication facility 1165 may then fabricate an integrated circuit that is based at least in part on the IP core design. The fabricated integrated circuit can be configured to perform operations in accordance with at least one embodiment described herein.

Figure 12:
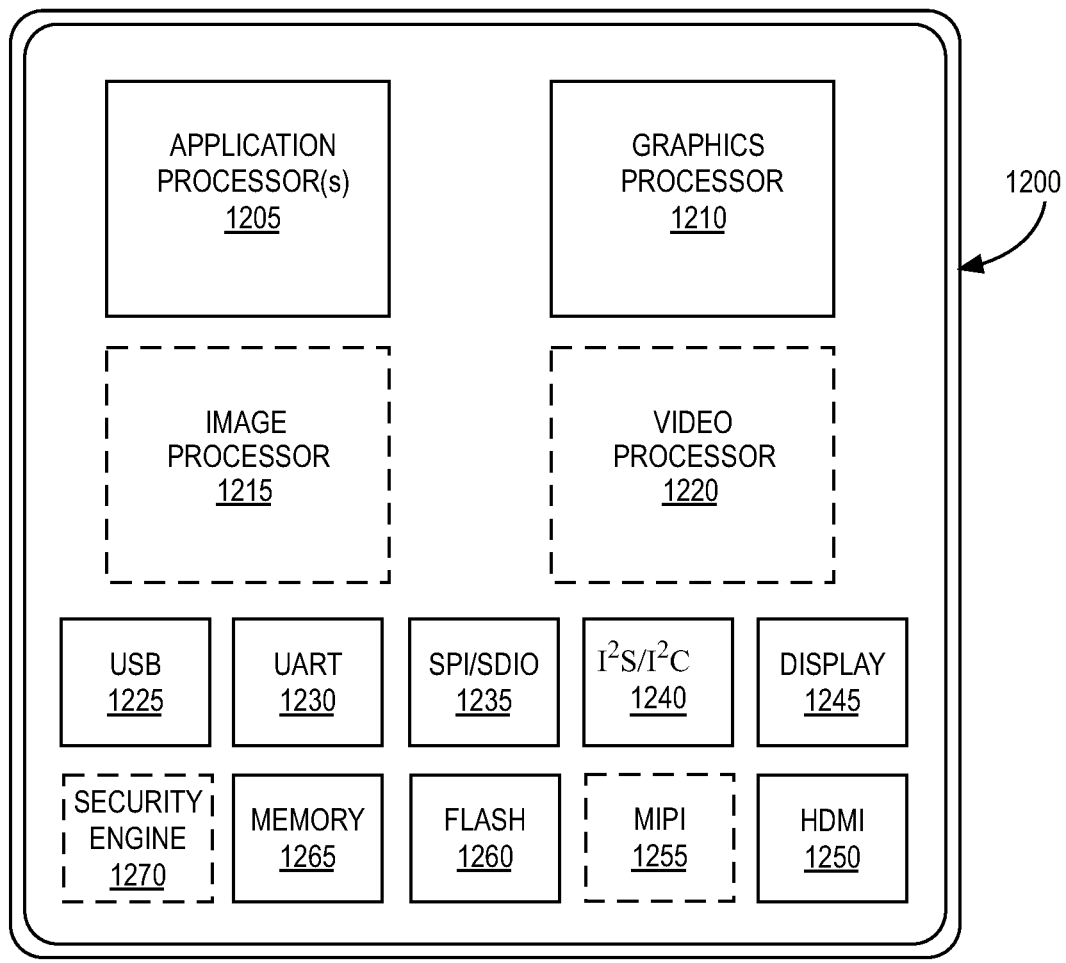
FIG. 12 is a block diagram illustrating an exemplary system on a chip integrated circuit that may be fabricated using one or more IP cores, according to an embodiment.

FIG. 12 is a block diagram illustrating an exemplary system on a chip integrated circuit 1200 that may be fabricated using one or more IP cores, according to an embodiment. The exemplary integrated circuit includes one or more application processors 1205 (e.g., CPUs), at least one graphics processor 1210, and may additionally include an image processor 1215 and/or a video processor 1220, any of which may be a modular IP core from the same or multiple different design facilities. The integrated circuit includes peripheral or bus logic including a USB controller 1225, UART controller 1230, an SPI/SDIO controller 1235, and an I$^2$S/I$^2$C controller 1240. Additionally, the integrated circuit can include a display device 1245 coupled to one or more of a high-definition multimedia interface (HDMI) controller 1250 and a mobile industry processor interface (MIPI) display interface 1255. Storage may be provided by a flash memory subsystem 1260 including flash memory and a flash memory controller. Memory interface may be provided via a memory controller 1265 for access to SDRAM or SRAM memory devices. Some integrated circuits additionally include an embedded security engine 1270.

Additionally, other logic and circuits may be included in the processor of integrated circuit 1200, including additional graphics processors/cores, peripheral interface controllers, or general-purpose processor cores.

Alpha Blending Bandwidth Saving During Render and Display Operations

During alpha blending operations, when the alpha channel for a pixel is zero, the blending operation will not change the pixel in destination buffer. For example, the Equation 1 below may be used for per-pixel alpha blending.

$$Output=alpha*Src+(1-alpha)*Dest$$
Equation 1: Per-Pixel Alpha Blending

When using pre-multiplied ARGB, an alternate equation may be used.

$$Output=Src+(1-alpha)*Dest$$
Equation 2: Pre-Multiplied Per-Pixel Alpha Blending In each case, if the input ARGB is zero, then the output will be equal to the destination color. Accordingly, a blend operation performed with an alpha value of zero will not result in a change to the color of the destination buffer.

Figure 13:
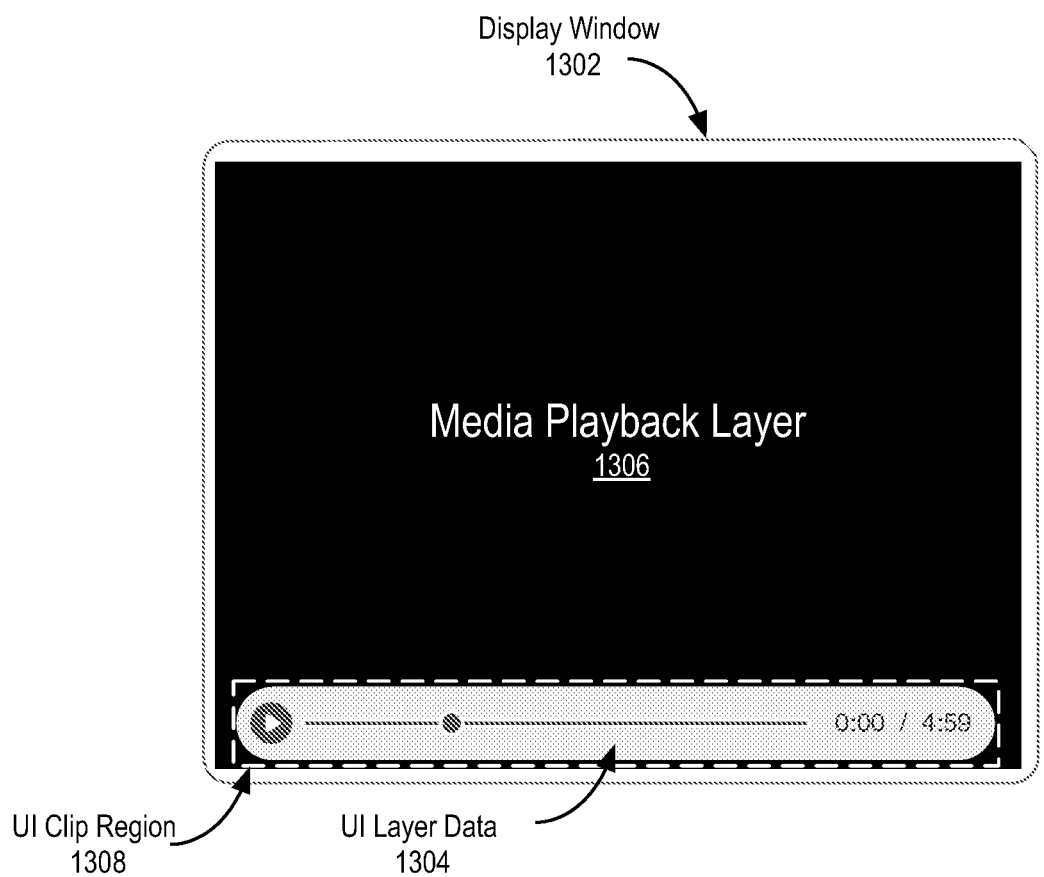
FIG. 13 is an illustration of user interface blending and composition, according to embodiments.

FIG. 13 shows an example of UI blending and composition 1300, according to embodiments. In one embodiment a display window 1302 is displayed on a display device by a graphics processor. The display window 1302 includes UI layer data 1304 that the graphics processor can blend with a media playback layer 1306 using a graphics processing engine or a display controller. A blending bandwidth reduction optimization can be performed under some circumstances in which the operating system and/or the graphics application set a clip region that defines the relevant regions of a UI surface. If the application sets a UI clip region 1308, whichever GPU component is assigned to perform a blending and composition operation for the display window 1302 (e.g., the display engine or the 3D graphics processing engine), alpha blending operations can be limited to the region of the display window 1302 inside of the UI clip region 1308. No blending operations would be performed for regions of the display window 1302 outside of the display window. Thus, operations on the irrelevant regions of the surface, which may be fully transparent, can be avoided.

However, many applications that make use of UI layer blending do not set the proper clip region to define the non-transparent region of the UI. If the UI clip region 1308 is not defined by the application, the entire UI layer may be blended with the media playback layer 1306, even though the majority of the UI layer is transparent (e.g., has a zero alpha). If a zero alpha value can be detected before a pixel or a region of pixels before blending operations are performed, the blending operation for the pixel or region of pixels can be skipped, which can increase performance and reduce power by avoiding a memory access and blend operation for a transparent region of a surface.

Embodiments described herein provide for an optimization to blending when transparency is enabled that avoids performing a memory access and blend operation between an upper and a lower display layer when the upper layer is entirely transparent.

In a tile based rendering GPU, surfaces are rendered on a tile-by-tile basis. In one embodiment, the optimization can be performed on a tile-by tile basis to skip memory access for a tile that is entirely transparent. A buffer can be created with a 1-bit marker associated with each region of tiled memory. If the sum of all pixel alpha values in a tile is zero, a marker associated with the tile can be set. After the entire render buffer is rendered, a count of the number of transparent tiles and a bit mask for the surface can be written to memory as render surface metadata. For blend operations using this render buffer, the display engine or graphics processing engine of the GPU can use this information to determine if any given tile needs to be accessed and blended, or if the memory access for the tile can be skipped and the blend operations can be bypassed. Accordingly, embodiments described herein do not rely solely on the application defined clip region to filter out transparent regions for blending.

Transparent Tile Bitmap

In a modern GPU a render surface can be split into tiles to improve memory access efficiency. For example, a four-kilobyte memory page can be used to store a 32×32 pixel block in the ARGB8888 pixel format, which includes four eight-bit data channels containing alpha, red, green, and blue pixel data. For the UI blending case it is possible for all alpha channel values of a 32×32 block to be zero. GPU logic can use a one-bit marker to indicate that a tile is fully transparent. This marker bit can later be used for alpha blending optimization. In one embodiment, a transparent tile bitmap of the marker bits can be stored in an auxiliary memory buffer to indicate that all of the pixels in a tile are transparent.

This optimization can be disabled when no transparent tiles are present. For example, when blending is performed using a pixel format that does not contain alpha data, this optimization can be globally disabled. Additionally, the optimization can be dynamically enabled or disabled based on a count of the number of fully transparent tiles. In one embodiment a count of fully transparent tiles is be stored (e.g., in the auxiliary memory buffer). This count can be used to determine whether to dynamically enable to disable the transparent tile optimization for blending. For example, when no transparent tiles exist on a surface, the logic to check the marker bits for each tile can be disabled at the blend stage. When the logic is disabled, a blend operation is performed for each tile without accessing the auxiliary memory buffer storing the marker bits for each tile.

Additionally, GPU updates to the marker bits can be dynamically disabled if the number of transparent tiles does not exceed a threshold. In one embodiment, the time required to check the marker bit for a tile that is not fully transparent can reduce the overall power and performance benefit of the optimization. Accordingly, a break-even threshold number of transparent tiles may exist in which the optimization is less effective unless at least a threshold number of transparent tiles exist within a surface. In one embodiment, after the GPU generates a frame, tiling marker bits and transparent tile count may be stored in internal cache memory. If the number of transparent tiles is less than a threshold, the cached transparent tile bitmap can be discarded and a zero transparent tile count can be written to memory, causing the optimization to be disabled for the blend stage.

Figure 14:
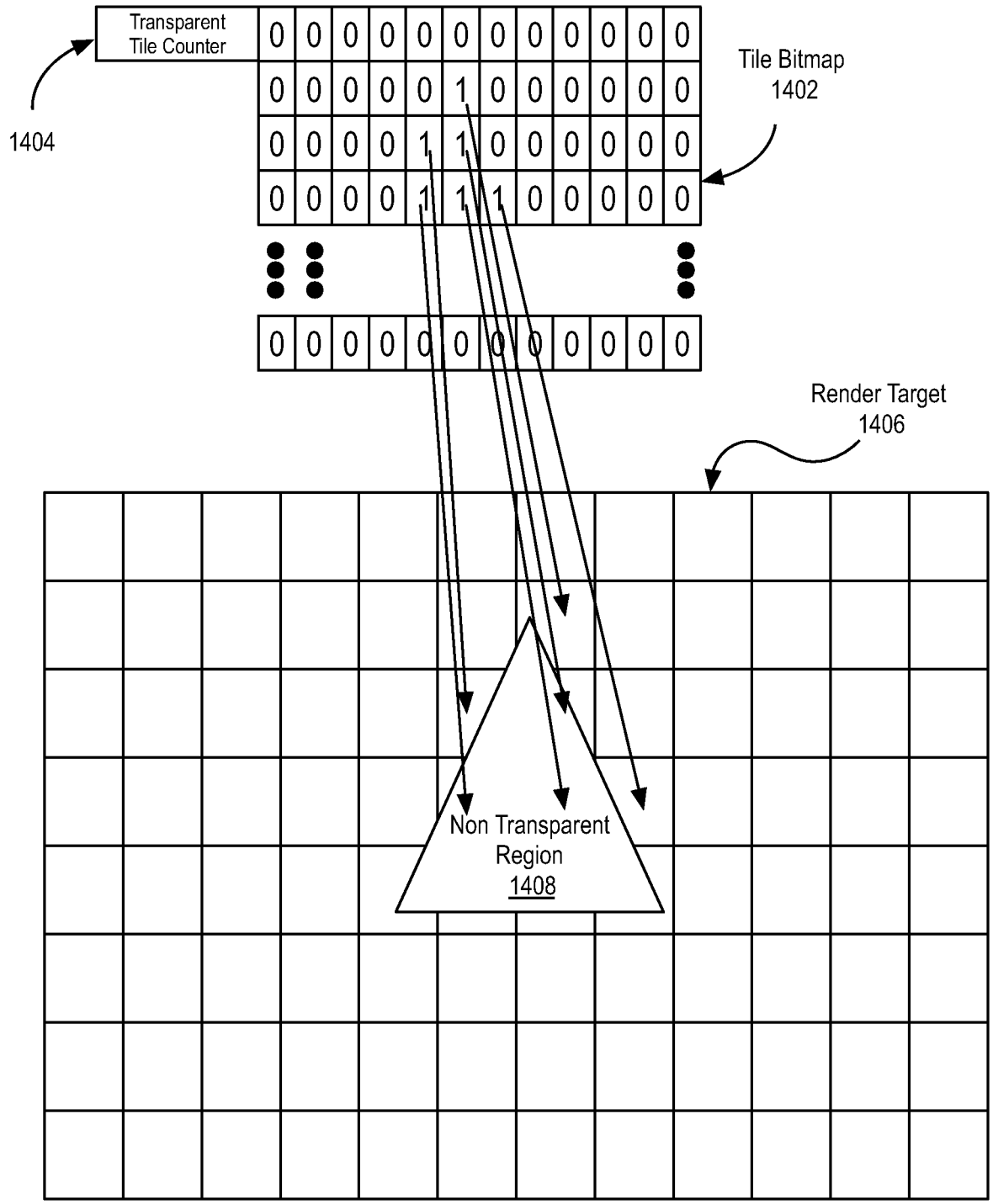
FIG. 14 is an illustration of a transparent tile bitmap, according to an embodiment.

FIG. 14 illustrates a transparent tile bitmap 1400, according to an embodiment. In one embodiment, a tile bitmap 1402 includes a marker bit for each tile associated with a render target 1406. A transparent tile counter 1404 can also be included that maintains a count of the number of transparent tiles on the render target 1406. As illustrated, the majority of the tiles on the render target 1406 are transparent. The tile bitmap 1402 can store markers that specifically indicate which tiles store non-transparent information. For example, tiles associated with the non-transparent region 1408 can be marked in the tile bitmap 1402.

Figure 15:
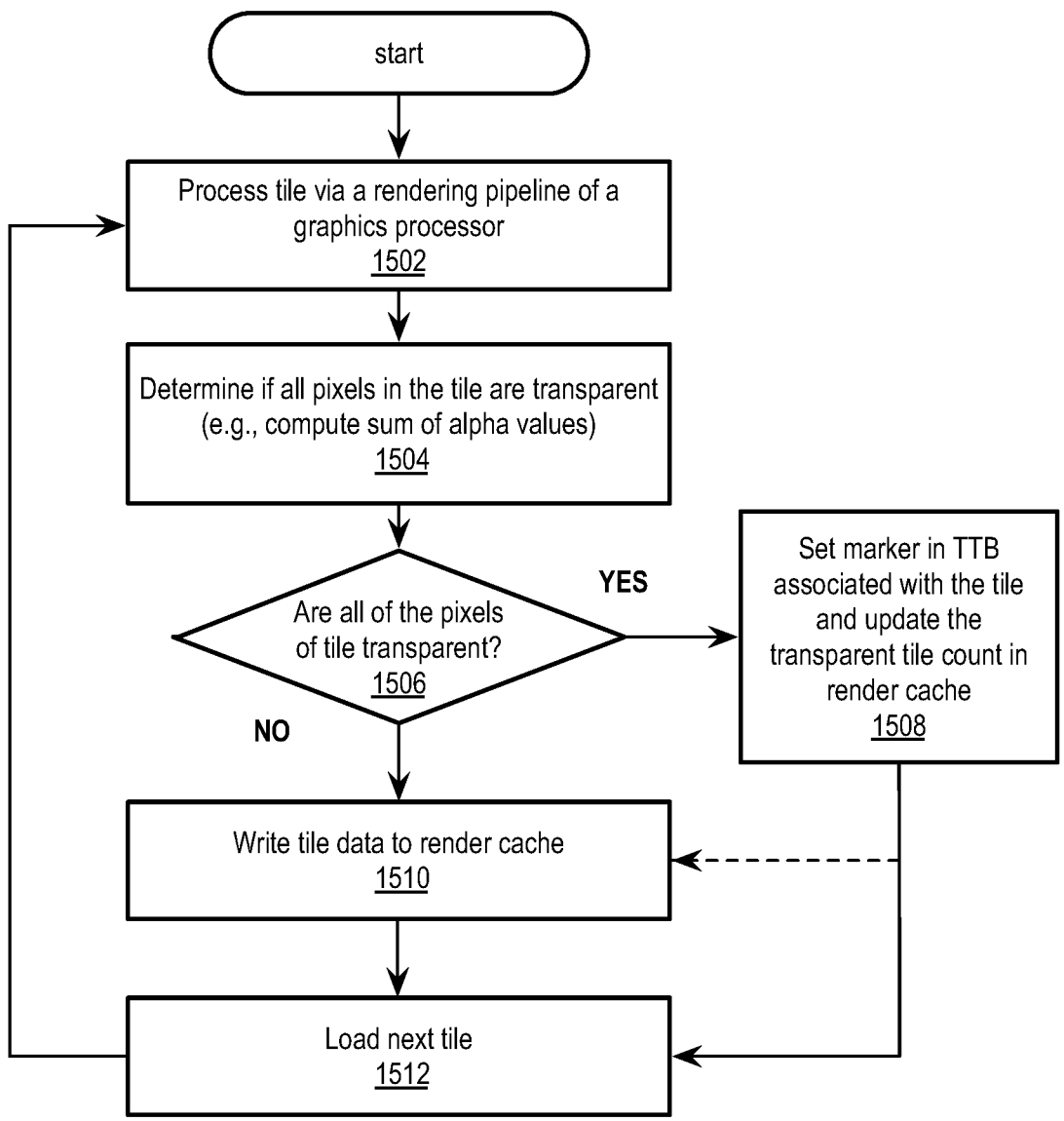
FIG. 15 is a flow diagram of transparent tile bitmap generation logic, according to an embodiment.

FIG. 15 is a flow diagram of transparent tile bitmap generation logic 1500, according to an embodiment. The transparent tile bitmap generation logic 1500 can process a tile via a rendering pipeline of a graphic processor, as shown at block 1502. At block 1504, the logic can determine if all of the pixels in the tile are transparent, for example, by computing a sum of the alpha values of each pixel in the tile, although other computational mechanisms can be used. If at 1506, the logic determines that all of the pixels of the tile are transparent (e.g., the sum of all pixel alpha values is zero), the logic can set the marker in the transparent tile bitmap associated with the tile and update the transparent tile count, as shown at block 1508. The transparent tile bitmap and the tile count, in one embodiment, are stored in a render cache or another low latency, localized cache memory such that the transparent tile bitmap and the count data can be written without incurring significant memory access delay. In one embodiment, if all of the pixels of the tile are transparent, a write to the render cache for the pixel data can be bypassed as well. In one embodiment, if all of the pixels of the tile are transparent, the pixel data may be written to the render cache but the write of the pixel data to higher levels of the graphics memory hierarchy (e.g., higher level caches, graphics memory, etc.) can be bypassed. In one embodiment, at least some information can be written to the render cache at block 1510 even if the tile data is transparent, for example, if the destination render target is configured for shared access with an application processor that is not configured to use, or is not able to access, the transparent tile bitmap.

In one embodiment, if at least some of the pixels of the tile are non-transparent, the transparent tile bitmap generation logic 1500, at block 1510, can write the tile data to the render cache. The transparent tile bitmap generation logic 1500 can then load the next tile for processing at block 1512. During the rendering process, the tile data in the render cache can be flushed from the cache to the render target in graphics memory.

Figure 16:
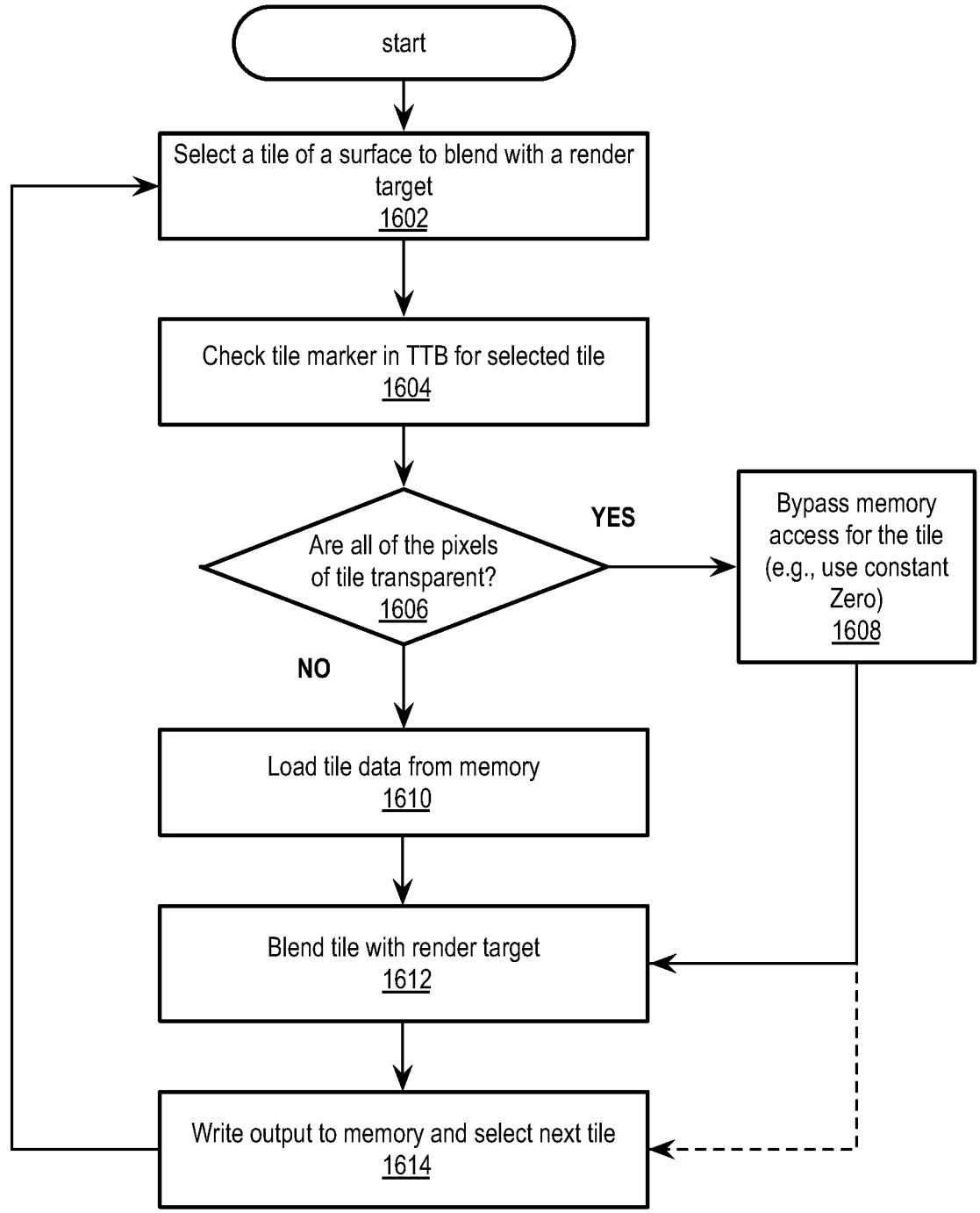
FIG. 16 is a flow diagram of transparent tile bitmap blending logic, according to an embodiment.

FIG. 16 is a flow diagram of transparent tile bitmap blending logic 1600, according to an embodiment. The transparent tile bitmap blending logic 1600 can perform an operation to select a tile of a surface to blend with a render target at block 1602. The logic can check the tile marker in the transparent tile bitmap for the selected file at block 1604. At 1606, the logic can determine if all of the pixels in the tile are transparent based on the tile marker.

If the tile includes at least some non-transparent tile data, the logic can load the tile data from memory at block 1610 before performing the operation to blend the tile with the render target at block 1612. After performing the blend operation at block 1612, the transparent tile bitmap blending logic 1600 can write the blended output for the tile to memory (e.g., cache memory) and select the next tile at block 1614.

If all of the pixels of the tile are transparent at 1606, the logic can perform an operation to bypass the memory access for the tile at block 1608 and use a constant zero value for the blend operation at block 1612. In one embodiment the transparent tile bitmap blending logic 1600 can bypass the blend operation entirely and write unblended output to memory by copying the lower blend layer to render target memory at block 1614 before selecting the next tile for operation.

Figure 17:
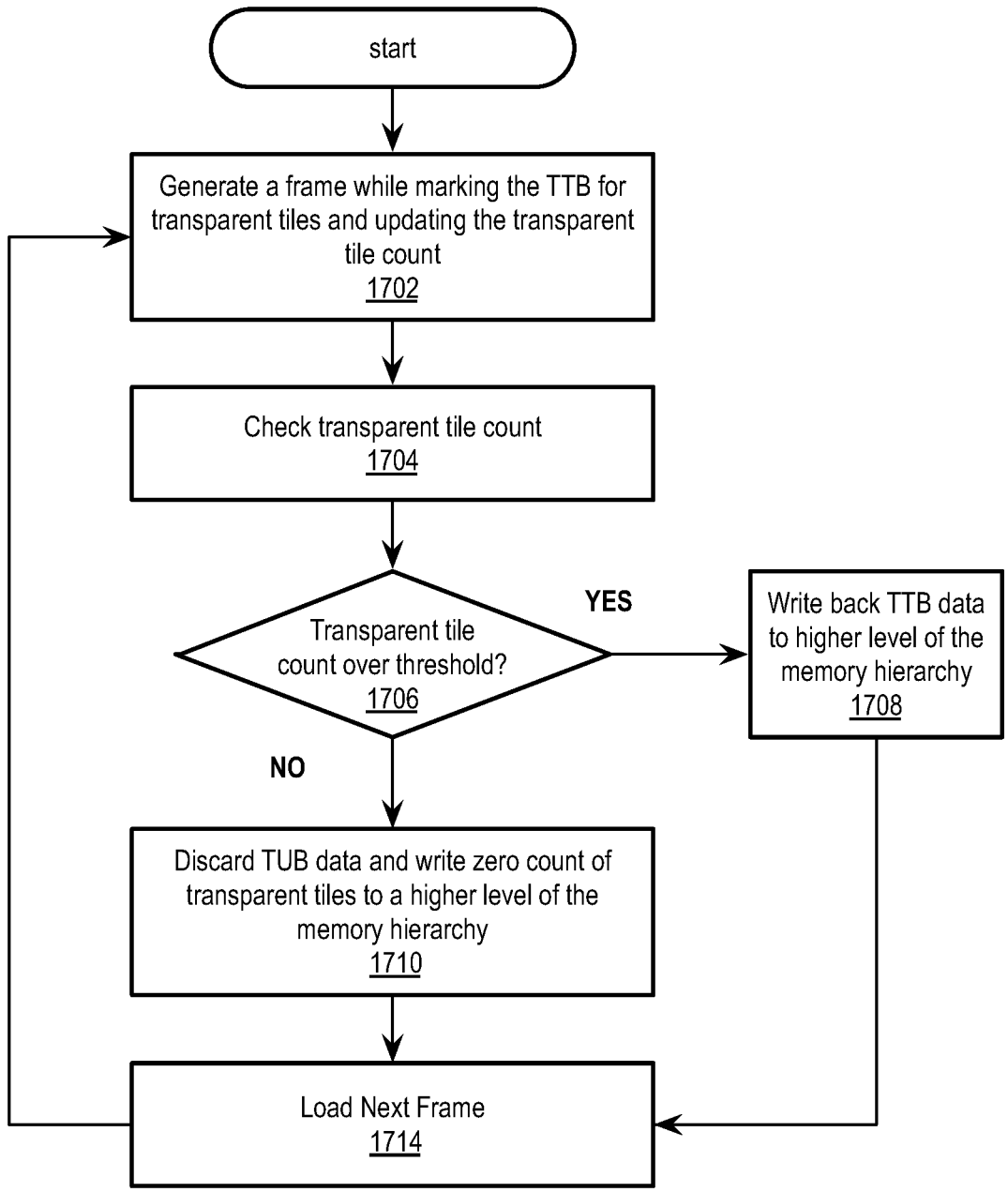
FIG. 17 is a flow diagram of transparent tile bitmap update logic, according to an embodiment.

FIG. 17 is a flow diagram of transparent tile bitmap update logic 1700, according to an embodiment. In one embodiment the transparent tile bitmap update logic 1700 performs operations to generate a frame of data while marking the transparent tile bitmap for transparent tiles and updating the transparent tile count, as shown at block 1702. The logic can then check the transparent tile count at block 1704. If at 1706 the transparent tile bitmap update logic 1700 determines the transparent tile count is over a threshold, the logic can write back the transparent tile bitmap data to a higher level of the GPU memory hierarchy at block 1708. The higher level of the memory hierarchy can be a higher-level GPU cache, a last level cache that is shared between the GPU and an application processor, or can be graphics memory. For unified memory architecture devices, the graphics memory can be a region of system memory.

If the transparent tile bitmap update logic 1700 determines the count of transparent tiles has not exceeded the threshold, the logic can perform an operation to discard the transparent tile bitmap data and write a zero count for the number of transparent tiles to the higher level of the memory hierarchy at block 1710. Writing a zero count at block 1710 effectively disables the transparent tile bitmap optimization during the blend stage for the frame. At block 1714, the transparent tile bitmap update logic 1700 can then load the next frame for processing. Disabling the transparent tile bitmap optimization during the blend stage for a frame can be performed, in one embodiment, if the number of transparent tiles in a frame is too low for the GPU to benefit from the transparent tile bitmap optimization once the transparent tile bitmap access overhead is considered. Additionally, in the case of GPU blending, the transparent tile bitmap optimization may be disabled if the upper surface is to be used by a pixel shader or if legacy alpha test enabled.

Display Partial Update with Render Surface Tile Update Information

Various technologies exist to enable a display to perform a local refresh of the display elements of the display without requiring new data to be received from a display engine coupled to the display. For example, panels that support the MIPI Command mode can be configured to enter a display self refresh (DSR) mode. Display that support embedded Display Port can be configured to support panel self refresh (PSR). Displays that support DSR or PSR include local memory on within the display device, which saves the updated display content. When the graphics processor renders frames for display on the display device, in many cases at least a portion of the data between successive renders to the same frame buffer does not change. Display partial update (DPU) can be performed such that only the updated regions of the frame are supplied to the display and the updated regions are not transmitted. The display engine on the GPU can transmit updated display data to the display device whenever changes between successive frames are detected. When the display engine is not transmitting updated data to the display, the display engine can be transitioned into a low power state, enabling reduced power consumption at least for the display engine portion of the GPU. While the display engine transmits a reduced amount of data at a potentially reduced rate, during each display refresh cycle the display device can update the display elements of the device at whatever frame rate is appropriate for the display elements.

Dirty Tile Bitmap Buffer

An existing hardware implementation includes logic to perform a hashing algorithm, such as a message digest algorithm (e.g., MD5) on each rendered tile of memory to determine if the display data generated for the tile differs from the previous data generated for the same tile. If a given tile does not change between frames, the memory write back of the tile data can be bypassed. In embodiments described herein, the display engine power savings provided by display partial update are enhanced by maintaining a dirty tile bitmap for use in display partial update. The dirty tile bitmap can reduce the power consumption of the display controller by leveraging the hashing logic for use in generating tile update bitmap metadata for a tile. The tile update bitmap can enable the display controller to bypass the memory access to read a tile of display memory when the tile has not been updated between frames. In addition to bypassing the memory access for the frame, an update for the tile data can be skipped and the redundant update information will not be transmitted to the DPU enabled display device.

Figure 18:
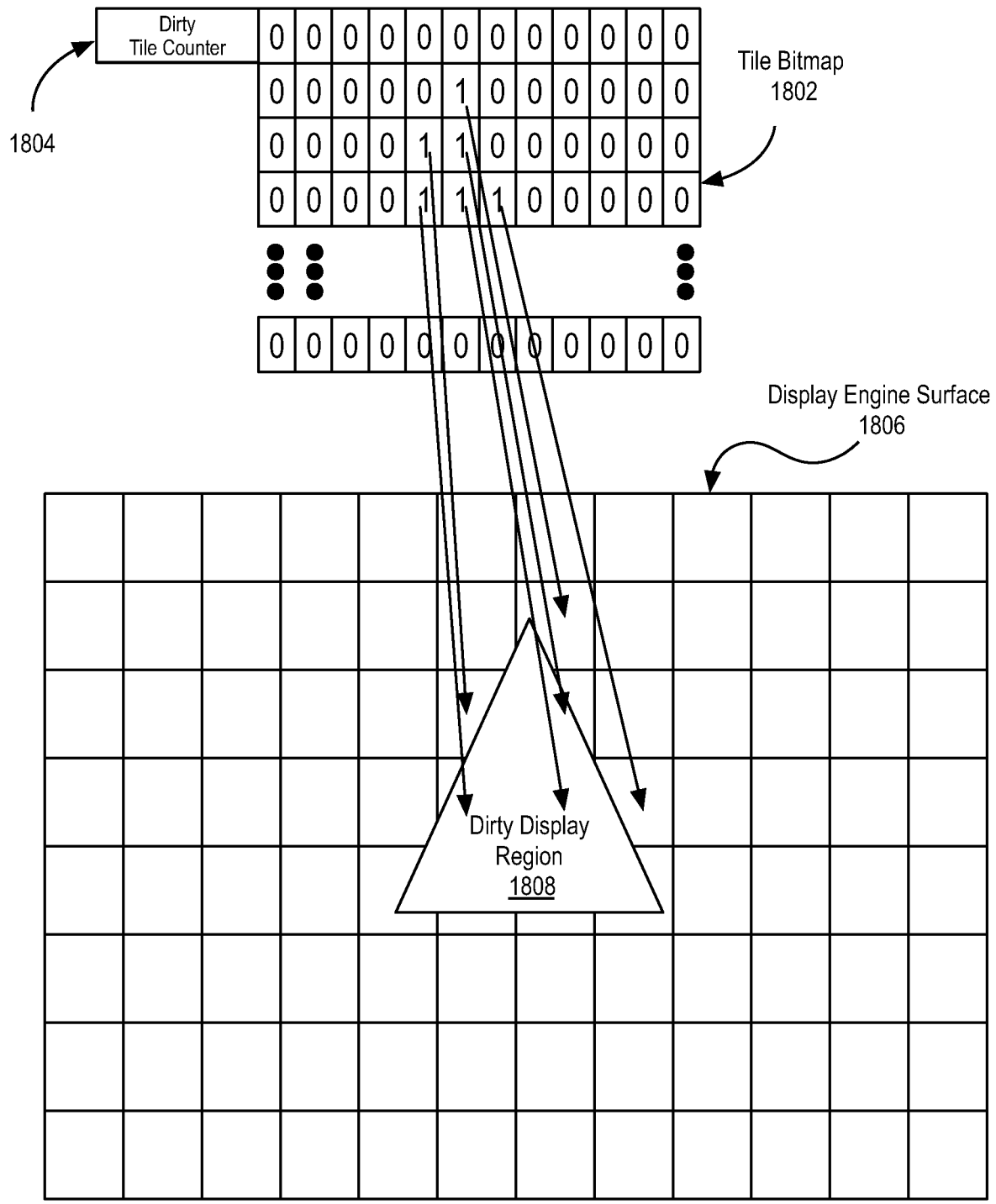
FIG. 18 is an illustration of a dirty tile bitmap, according to an embodiment.

FIG. 18 illustrates a dirty tile bitmap 1800, according to an embodiment. In one embodiment the dirty tile bitmap 1800 can be used for display partial update in an analogous manner as the transparent tile bitmap 1400 of FIG. 14. However, the dirty tile bitmap 1800 tracks tiles containing dirty (e.g., updated), rather than transparent tiles. In one embodiment, a tile bitmap 1802 includes a marker bit for each tile associated with a display engine surface 1806. A dirty tile counter 1804 can also be included that maintains a count of the number of updates tiles on the display engine surface 1806. As illustrated, the majority of the tiles on the display engine surface 1806 are not updated. The tile bitmap 1802 can store markers that specifically indicate which tiles are updated between frames based on a hash value of the tile computed for successive frames. Where tile data changes between frames, a marker for the tile can be flagged in the tile bitmap 1802. For example, tiles associated with the updated display region 1808 can be marked in the tile bitmap 1802.

The tile bitmap 1802 can be stored in an auxiliary buffer within, attached to, or otherwise associated with a render buffer, along with an additional auxiliary buffer containing a hash of the pixel data within each tile of the render buffer. When a tile is rendered, logic within the GPU can automatically calculate a hash value for the tile. The GPU logic can then check the generated hash value with the hash value stored in the previous frame for the same tile. If the hash values match, the rendered data for the tile has not changed. Accordingly, the GPU can discard the rendered data and bypass the write of the tile data to the render buffer. However, if the tile is updated, the GPU can write the updated data to memory and mark an entry in the tile bitmap 1802 to indicate that the tile has updated. The dirty tile counter 1804 can also be incremented for each dirty tile in a frame.

In one embodiment, the dirty tile bitmap 1800 is initialized to zero and the GPU only marks tiles that are updated. In one embodiment, only the dirty tile counter 1804 is initialized to zero each frame. In such embodiment a marker in the tile bitmap 1802 is set to one when a tile is updated and set to zero when a tile is not updated.

Dirty Tile Bitmap Generation

Figure 19:
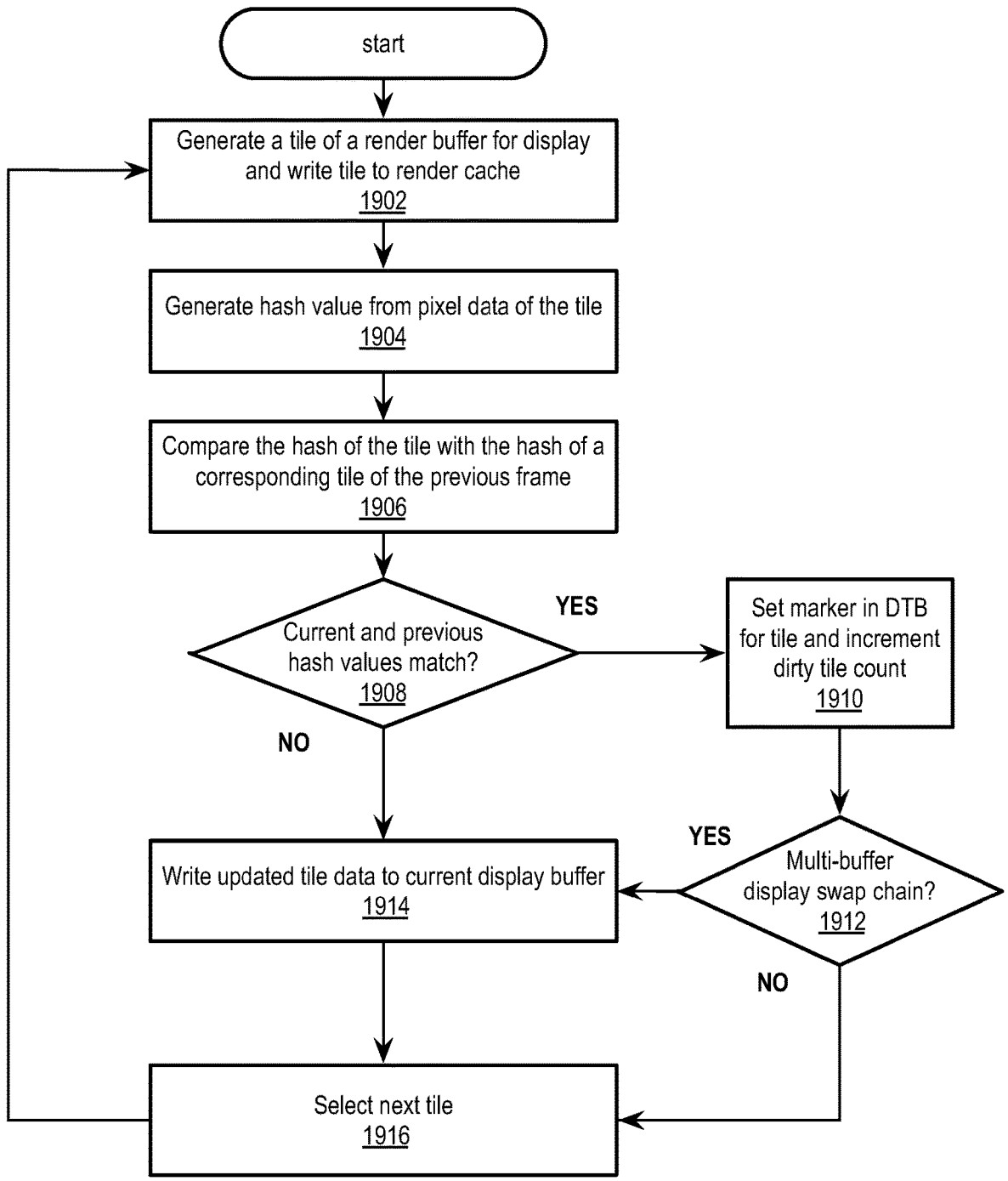
FIG. 19 is a flow diagram of dirty tile bitmap generation logic, according to an embodiment.

FIG. 19 is a flow diagram of dirty tile bitmap generation logic 1900, according to an embodiment. The dirty tile bitmap generation logic 1900 can reside in the display engine and/or the graphics processing engine of a graphics processor and can be executing during operations such as rendering or blending. The dirty tile bitmap generation logic 1900 can generate a tile of a render buffer for display and write the generated tile data to a render cache, as shown at block 1902. The dirty tile bitmap generation logic 1900 can then generate a hash value from the pixel data for the tile. The hash value can be generated using one of several hash algorithms. In one embodiment, the graphics processor includes hardware logic to automatically perform an MD5 hash on each rendered tile and store the hash value in an auxiliary hash buffer, which may be at least initially generated and stored in cache memory of the graphics processor.

After the hash value of the pixel data is generated at block 1904, the dirty tile bitmap generation logic 1900 can compare the hash of the tile with the hash of a corresponding tile from the previous frame at block 1906. If at 1908 the dirty tile bitmap generation logic 1900 determines the current and previous hash values match, the logic can set a marker for the tile in the dirty tile bitmap buffer to indicate that the tile contains updated data and increment the dirty tile count at block 1910. In the event of a multi-buffer display swap chain (e.g., front-buffer, back-buffer, etc.) the render target will be updated even the data to be written matches the hash of the previous frame. If the current render target is the same as the previous render target and has not been cleared between the previous and current render operation, the write operation to the render target can be bypassed to avoid a redundant write of data. At block 1912, the dirty tile buffer generation logic 1900 can determine if a multi-buffer display swap chain having multiple render targets is in use and can write the tile data to the current display buffer, as shown at block 1914. The write of the tile data to the current display buffer can be performed, for example, by flushing the region of the render cache containing the tile data to display buffer memory, as shown at block 1914. If a multi-buffer display swap chain is not in use at 1912, the dirty tile buffer generation logic 1900 can bypass the write of the tile data to memory at block 1914 and proceed to select the next tile for processing at block 1916.

Dirty Tile Bitmap Buffer and Display Partial Update

MIPI command mode and eDP PSR supported displays include local memory to store a refresh image. The content in the memory needs to be updated only when the content is updated. Display controller can use the dirty tile bitmap auxiliary buffer generated by GPU to decide which part of memory needs to be fetched and written to panel memory. Before update one tile of panel memory, display controller checks a dirty tile bitmap buffer attached to the color buffer. If the bit of that tile is 1, display controller continue to read data from memory and write it to panel memory; if the bit is 0, display controller can skip the update operation.

Figure 20:
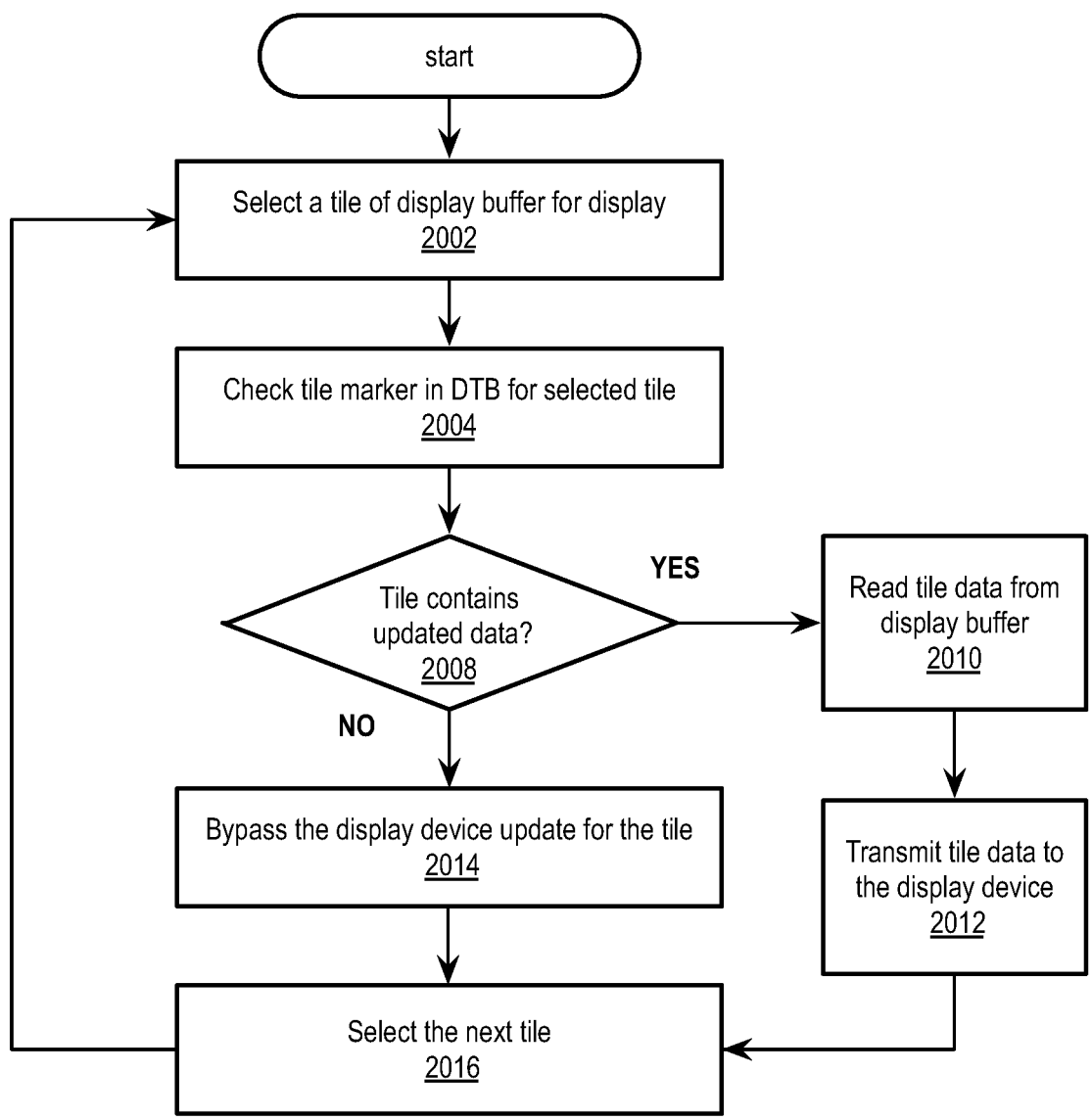
FIG. 20 is a flow diagram of dirty tile bitmap display partial update logic, according to an embodiment.

FIG. 20 is a flow diagram of the logic 2000 for using the dirty tile bitmap buffer for display partial update, according to an embodiment. In one embodiment the dirty tile bitmap display partial update logic 2000 can be performed by a display engine with the graphics processor. The dirty tile bitmap buffer display partial update logic 2000 can select a tile of a display buffer for display at block 2002. At block 2004 the logic can check the tile marker in the dirty tile bitmap buffer for the selected tile. If the dirty tile bitmap buffer display partial update logic 2000 determines the tile contains updated data at 2008, the logic can read the tile data from the display buffer at block 2010 and write the tile data to the display device at block 2012.

If the dirty tile bitmap buffer display partial update logic 2000 determines, at 2008, that the tile does not contain updated data, the logic can bypass the display device update for the tile, as shown at block 2014. Once the tile is bypassed at block 2014 or transmitted at block 2012, the dirty tile bitmap display partial update logic 2000 can select the next tile at block 2016.

Reducing Dirty Tile Bitmap Buffer Overhead

In one embodiment, the dirty tile counter can be used to dynamically enable or disable the use of the dirty tile bitmap buffer for display partial update. If the dirty and/or updated tile ratio is over a threshold (e.g., approaching 100%), use of the dirty tile bitmap buffer for the graphics processing engine can be disabled and all tiles in the tile bitmap can be marked as dirty.

Figure 21:
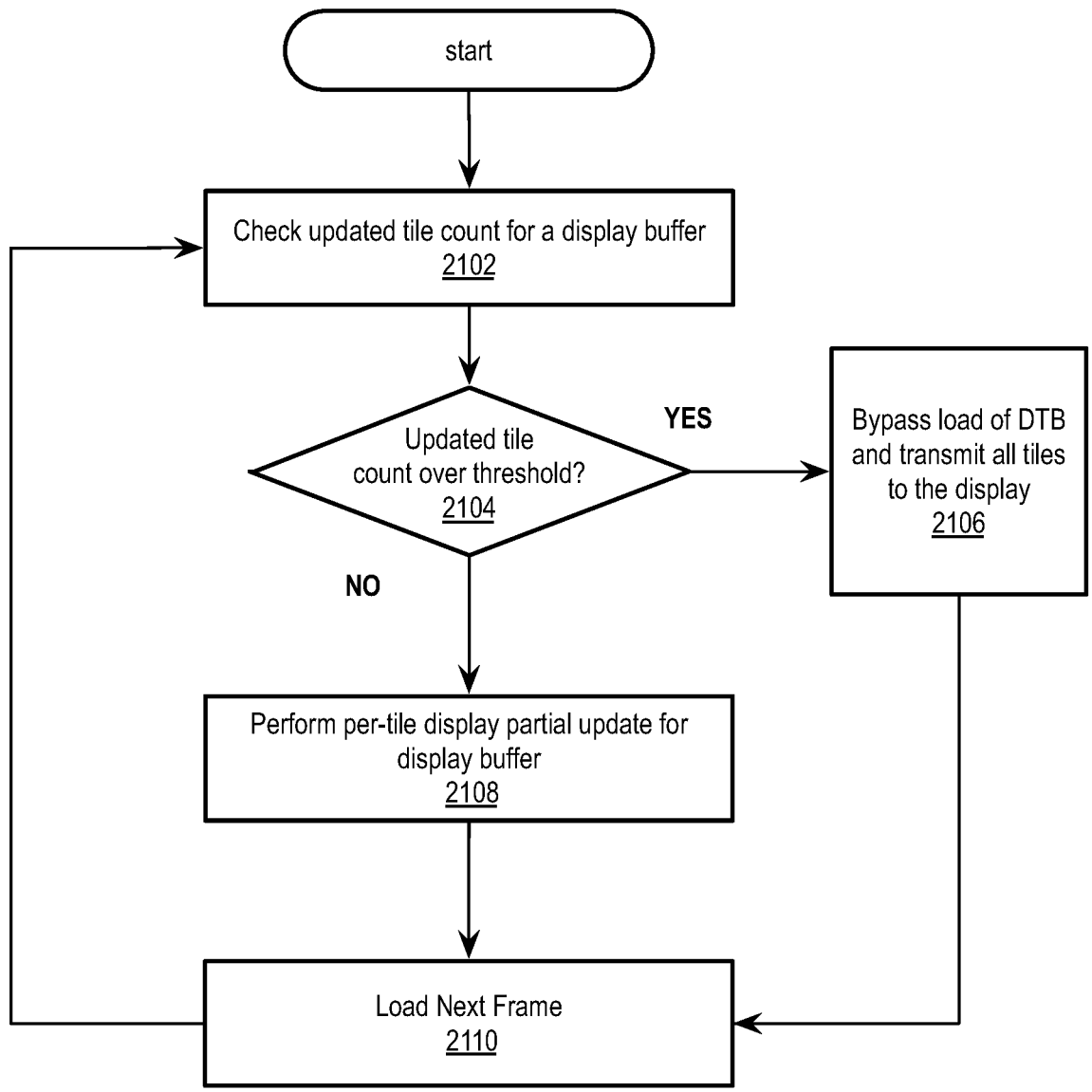
FIG. 21 is a flow diagram of dirty tile bitmap dynamic disable logic, according to an embodiment.

FIG. 21 is a flow diagram for dirty tile bitmap buffer dynamic disable logic 2100, according to an embodiment. The dirty tile bitmap buffer dynamic disable logic 2100 can be used to determine, for a given scene, whether to perform a per-tile display partial update or whether to update the entire display. At block 2102, the dirty tile bitmap buffer dynamic disable logic 2100 can check the dirty tile count for a display buffer and, at 2104, determine if the dirty tile count is over a threshold. If the dirty tile count is over a threshold at 2104 (e.g., approaching nearly all tiles), the dirty tile bitmap buffer dynamic disable logic 2100 can bypass the load of the dirty tile bitmap from the dirty tile bitmap buffer and transmit all of the tile of the display buffer to the display at block 2106. If the update tile count is not over the threshold at 2104, the dirty tile bitmap buffer dynamic disable logic 2100 can perform a per-tile display partial update of the display buffer at block 2108. The per-tile display partial update can be performed in accordance with the dirty tile bitmap buffer display partial update logic 2000 of FIG. 20. After performing a complete update at block 2106 or a partial update at block 2108, the dirty tile bitmap buffer dynamic disable logic 2100 can proceed to load the next frame of data, as shown at block 2110.

Figure 22:
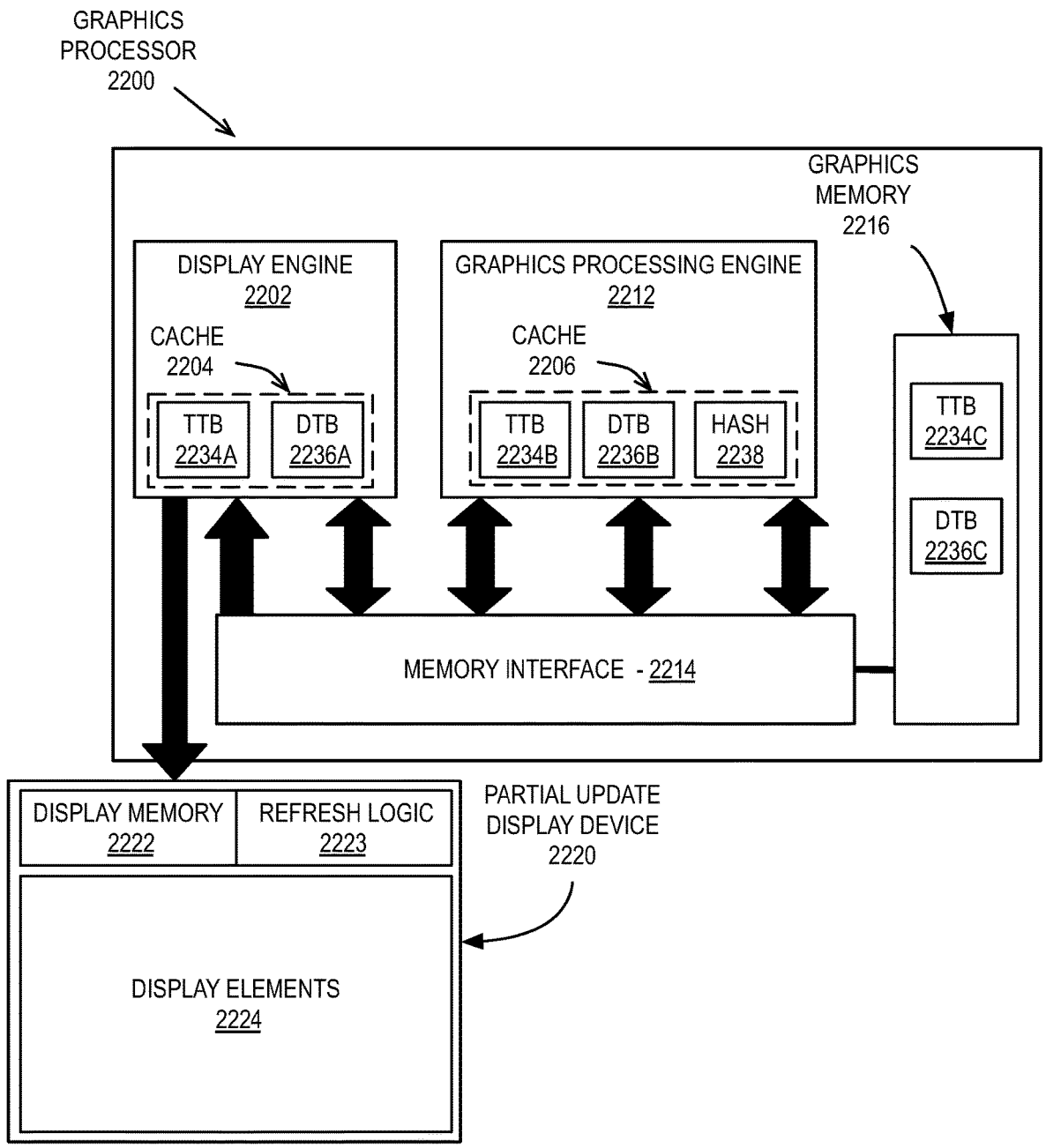
FIG. 22 is a block diagram of a graphics processor and partial update display device, according to an embodiment.

FIG. 22 is a block diagram of a graphics processor 2200 configured to use transparent tile bitmap buffers 2234A-C and dirty tile bitmap buffers 2236A-C, according to an embodiment. In one embodiment the graphic processor 2200 includes a display engine 2202 and a graphics processing engine 2212. The display engine 2202 can include the display controller 302 and blit engine 304 of the graphics processor 300 shown in FIG. 3. The graphics processing engine 2212 can include components associated with the graphics processing engine (GPE) 310 of FIG. 3. The display engine 2202 and the graphics processing engine 2212 can each couple to graphics memory 2216 via a memory interface 2214. The display engine 2202 and the graphics processing engine 2212 can each include cache memories, such as a display engine cache 2204 and a graphics processing engine cache 2206. In one embodiment, at least a portion of the display engine cache 2204 is coherent with the graphics processing engine cache 2206.

During operation, the display engine 2202 and graphics processing engine 2212 can each make use of transparent tile bitmap buffers (TTB) 2234A-C located in graphics memory 2216 and the cache memories 2204, 2206 within the graphics processor 2200. The display engine 2202 can use the display engine cache 2204 to cache display data or metadata, including transparent tile metadata such as the transparent tile bitmap stored in a cached version of the transparent tile bitmap buffer 2234A. The transparent tile bitmap buffer 2234A in the display engine cache 2204 can be used during display blend operations for display memory with a pixel format having transparency (e.g., alpha) data. The graphics processing engine 2212 can use the graphic processing engine cache 2206 to store a transparent tile bitmap buffer 2234B for a surface. The graphics processing engine 2212 can use the cached transparent tile bitmap buffer 2234B when performing blend operations for two surfaces having a pixel format that includes transparency data. Either one of the display engine 2202 and the graphics processing engine 2212 can use transparent tile buffer blending logic, such as the transparent tile bitmap blending logic 1600 as in FIG. 16.

The cached versions of the transparent tile bitmap buffers 2234A-B can be based on a version of the transparent tile bitmap buffer 2234C that is stored in graphics memory 2216 in association with a display surface. In one embodiment the graphics processing engine 2212 is configured to generate the transparent tile bitmap buffer 2234C in graphics memory 2216 and cache write and read operations to the transparent tile 2234C via the cached version of the transparent tile bitmap buffer 2234B in the cache 2206. The transparent tile bitmap buffer 2234C can be generated via the transparent tile bitmap generation logic 1500 of FIG. 15.

The display engine 2202 and graphics processing engine 2212 can also make use of dirty tile bitmap buffers (DTB) 2236A-C located in the graphics memory 2216 and the cache memories 2204, 2206 within the graphics processor 2200. The graphics processing engine 2212 can create a dirty tile buffer 2236C in graphics memory. When the graphics processing engine 2212 renders to a render target surface, a hash table 2238 can be generated for the surface in the graphics processing engine cache 2206 that stores a hash (e.g., MD5, etc.) of the data within the tile. The hash table 2238 can be used to store hash data for a frame and the stored hash data can be compared with hash data generated for a successive surface. Tiles having changes between successive frames can be marked in the dirty tile buffer 2236B in the graphics processing engine cache 2206. The dirty tile bitmap buffer 2236B for a surface can be updated via the dirty tile bitmap buffer generation logic 1900 as in FIG. 19 and may be flushed from the cache to a dirty tile bitmap buffer 2236C in graphics memory 2216.

In one embodiment the display engine 2202 stores cached version of the dirty tile bitmap buffer 2236A in the display engine cache 2204. The cached dirty tile bitmap buffer 2236A in the display engine cache 2204 can be used during display update operations to a display device having support for partial update operations, for example, using the dirty tile bitmap buffer display partial update logic 2000 as in FIG. 20.

The display engine 2202 can couple to a partial update display device 2220 via a display connector. The partial update display device 2220 can include display memory 2222 to store data for display via display elements 2224 (e.g., LCD, LED, OLED, etc.). Refresh logic 2223 on the partial update display device 2220 can be configured to refresh the display element 2224 from the display memory 2222. As the partial update display device 2220 is able to persist display data in the display memory 2222, generally only updated display data is transmitted from the display engine to the partial update display device.

Figure 23:
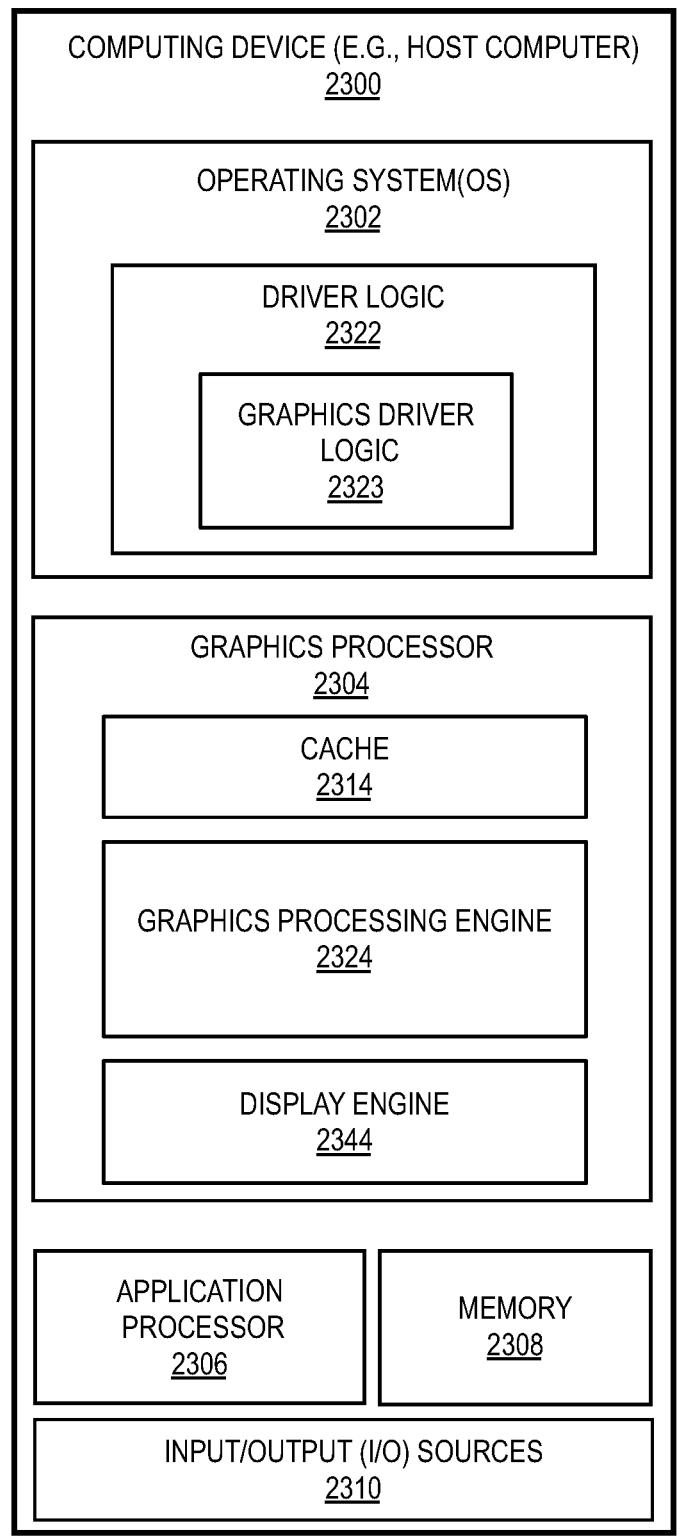
FIG. 23 is a block diagram of a computing device, according to an embodiment.

FIG. 23 is a block diagram of a computing device 2300, according to an embodiment. The computing device 2300 can be a computing device such as the data processing system 100 as in of FIG. 1, or may be or be included within a communication device such as a set-top box (e.g., Internet-based cable television set-top boxes, etc.), global positioning system (GPS)-based devices, etc. The computing device 2300 may also be or be included within mobile computing devices such as cellular phones, smartphones, personal digital assistants (PDAs), tablet computers, laptop computers, e-readers, smart televisions, television platforms, wearable devices (e.g., glasses, watches, bracelets, smartcards, jewelry, clothing items, etc.), media players, etc. For example, in one embodiment, the computing device 2300 includes a mobile computing device employing an integrated circuit ("IC"), such as system on a chip ("SoC" or "SOC"), integrating various hardware and/or software components of computing device 2300 on a single chip.

The graphic processor 2304 can be a version of the graphics processor 2200 of FIG. 22, and includes a cache 2314, graphics processing engine 2324, and a display engine 2344. In one embodiment the cache 2314 is a render cache for performing rendering or blending operations and/or a display cache for storing display data or metadata, such as the transparent tile bitmap buffer or dirty tile bitmap buffers described herein. In one embodiment, the cache 2314 can also include an additional level of the memory hierarchy, such as a last level cache stored in the embedded memory module 218 of FIG. 2.

In addition to a graphics processor 2304, the computing device 2300 may further include any number and type of hardware components and/or software components, such as (but not limited to) an application processor 2306, memory 2308, and input/output (I/O) sources 2310. The application processor 2306 can interact with a hardware graphics pipeline, as illustrated with reference to FIG. 3, to share graphics pipeline functionality. Processed data is stored in a buffer in the hardware graphics pipeline, and state information is stored in memory 2308. The resulting image is then transferred to a display controller for output via a display device, such as the display device 320 of FIG. 3 or the partial update display device 2220 of FIG. 22. The display device may be of various types, such as Cathode Ray Tube (CRT), Thin Film Transistor (TFT), Liquid Crystal Display (LCD), Organic Light Emitting Diode (OLED) array, etc., and may be configured to display information to a user.

The application processor 2306 can include one or processors, such as processor(s) 102 of FIG. 1, and may be the central processing unit (CPU) that is used at least in part to execute an operating system (OS) 2302 for the computing device 2300. The OS 2302 can serve as an interface between hardware and/or physical resources of the computer device 2300 and a user. The OS 2302 can include driver logic 2322 for various hardware devices in the computing system 2 300. The driver logic 2322 can include graphics driver logic 2323 such as the user mode graphics driver 1026 and/or kernel mode graphics driver 1029 of FIG. 10. In one embodiment the graphics driver logic 2323 can be used to configure the use of the dirty tile bitmap buffer or transparent tile bitmap buffer by the graphics processing engine 2324 and/or the display engine 2344.

It is contemplated that in some embodiments, the graphics processor 2304 may exist as part of the application processor 2306 (such as part of a physical CPU package) in which case, at least a portion of the memory 2308 may be shared by the application processor 2306 and graphics processor 2304, although at least a portion of the memory 2308 may be exclusive to the graphics processor 2304, or the graphics processor 2304 may have a separate store of memory. The memory 2308 may comprise a pre-allocated region of a buffer (e.g., framebuffer); however, it should be understood by one of ordinary skill in the art that the embodiments are not so limited, and that any memory accessible to the lower graphics pipeline may be used. The memory 2308 may include various forms of random access memory (RAM) (e.g., SDRAM, SRAM, etc.) comprising an application that makes use of the graphics processor 2304 to render a desktop or 3D graphics scene. A memory controller hub, such as memory controller hub 116 of FIG. 1, may access data in the memory 2308 and forward it to graphics processor 2304 for graphics pipeline processing. The memory 2308 may be made available to other components within the computing device 2300. For example, any data (e.g., input graphics data) received from various I/O sources 2310 of the computing device 2300 can be temporarily queued into memory 2308 prior to their being operated upon by one or more processor(s) (e.g., application processor 2306) in the implementation of a software program or application. Similarly, data that a software program determines should be sent from the computing device 2300 to an outside entity through one of the computing system interfaces, or stored into an internal storage element, is often temporarily queued in memory 2308 prior to its being transmitted or stored.

The I/O sources can include devices such as touchscreens, touch panels, touch pads, virtual or regular keyboards, virtual or regular mice, ports, connectors, network devices, or the like, and can attach via an input/output (I/O) control hub (ICH) 130 as referenced in FIG. 1. Additionally, the I/O sources 2010 may include one or more I/O devices that are implemented for transferring data to and/or from the computing device 2300 (e.g., a networking adapter); or, for a large-scale non-volatile storage within the computing device 2300 (e.g., hard disk drive). User input devices, including alphanumeric and other keys, may be used to communicate information and command selections to graphics processor 2304. Another type of user input device is cursor control, such as a mouse, a trackball, a touchscreen, a touchpad, or cursor direction keys to communicate direction information and command selections to GPU and to control cursor movement on the display device. Camera and microphone arrays of the computer device 2300 may be employed to observe gestures, record audio and video and to receive and transmit visual and audio commands.

I/O sources 2310 configured as network interfaces can provide access to a network, such as a LAN, a wide area network (WAN), a metropolitan area network (MAN), a personal area network (PAN), Bluetooth, a cloud network, a cellular or mobile network (e.g., $3^{rd}$ Generation (3G), $4^{th}$ Generation (4G), etc.), an intranet, the Internet, etc. Network interface(s) may include, for example, a wireless network interface having one or more antenna(e). Network interface(s) may also include, for example, a wired network interface to communicate with remote devices via network cable, which may be, for example, an Ethernet cable, a coaxial cable, a fiber optic cable, a serial cable, or a parallel cable.

Network interface(s) may provide access to a LAN, for example, by conforming to IEEE 802.11 standards, and/or the wireless network interface may provide access to a personal area network, for example, by conforming to Bluetooth standards. Other wireless network interfaces and/or protocols, including previous and subsequent versions of the standards, may also be supported. In addition to, or instead of, communication via the wireless LAN standards, network interface(s) may provide wireless communication using, for example, Time Division, Multiple Access (TDMA) protocols, Global Systems for Mobile Communications (GSM) protocols, Code Division, Multiple Access (CDMA) protocols, and/or any other type of wireless communications protocols.

It is to be appreciated that a lesser or more equipped system than the example described above may be preferred for certain implementations. Therefore, the configuration of the computing device 2300 may vary from implementation to implementation depending upon numerous factors, such as price constraints, performance requirements, technological improvements, or other circumstances. Examples include (without limitation) a mobile device, a personal digital assistant, a mobile computing device, a smartphone, a cellular telephone, a handset, a one-way pager, a two-way pager, a messaging device, a computer, a personal computer (PC), a desktop computer, a laptop computer, a notebook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combinations thereof.

Embodiments may be implemented as any one or a combination of: one or more microchips or integrated circuits interconnected using a parent-board, hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

Embodiments may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection).

The following clauses and/or examples pertain to specific embodiments or examples thereof. Specifics in the examples may be used anywhere in one or more embodiments. One embodiment provides for a graphics processing apparatus including a graphics processing engine configured for tiled memory access, the graphics processing engine is configured to render pixel data to a tile of memory and write to metadata associated with the tile of memory that indicates a data characteristic of the pixel data. The data characteristic can include that the pixel data is transparent or that the pixel data is dirty (e.g., has been updated).

One embodiment provides for a system on a chip integrated circuit including an application processor and a graphics processor, the integrated circuit comprising a graphics processing engine to render pixel data to a tile of memory associated with a surface and write to metadata associated with the tile of memory that indicates a data characteristic of the pixel data and a display engine to output the pixel data in the tile of memory via a display connector conditionally based on the metadata associated with the tile of memory.

One embodiment provides for a graphics processing system including an application processor coupled to a graphics processor, wherein the application processor and the graphics processor are to perform processing operations including processing a tile via a rendering pipeline of the graphics processor, determining if all pixels of the tile are transparent, and setting, in a transparent tile bitmap, a marker associated with the tile when all pixels of the tile are transparent. In one embodiment the graphics processing system includes a display device including display memory, a system on a chip integrated circuit coupled to the display device, the system on a chip integrated circuit including an application processor and a graphics processor, wherein the application processor and the graphics processor are to perform processing operations including selecting a tile of memory associated with a display buffer for display via the display device, checking a tile marker in a dirty tile bitmap for the selected tile to determine if the tile contains updated pixel data relative to a previous frame, and transmitting the pixel data of the tile to the display memory of the display device when the tile marker indicates that the tile contains updated pixel data.

The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to perform acts of the method, or of an apparatus or system according to embodiments and examples described herein. Various components can be a means for performing the operations or functions described.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

What is claimed is:

1. A graphics processing apparatus comprising:
a graphics processing engine configured for tiled memory access, the graphics processing engine to render pixel data to a tile of memory and write to metadata associated with the tile of memory that indicates a data characteristic of the pixel data, wherein the data characteristic of the pixel data includes an indicator that the pixel data of a current frame differs from a corresponding tile of a previous frame and metadata is associated with a first count that indicates a number of tiles in the current frame that differ from the previous frame, wherein the graphics processing engine to store a second count to the metadata and, before a blend operation, read the second count indicating a number of tiles in a surface containing transparent pixel data and bypass a memory read operation for the metadata that indicates the pixel data is transparent when the second count indicates that the number of tiles in the surface that contain transparent pixel data is less than a threshold.

2. The graphics processing apparatus as in claim 1, wherein the data characteristic of the pixel data is to indicate that the pixel data is transparent.

3. The graphics processing apparatus as in claim 1, wherein the graphics processing engine, during a blend operation, is to read the metadata associated with the tile of memory and bypass a memory read operation for the pixel data in the tile of memory when the metadata indicates that the pixel data is transparent.

4. The graphics processing apparatus as in claim 3, wherein the graphics processing engine is further to bypass the blend operation when the metadata indicates that the pixel data is transparent.

5. The graphics processing apparatus as in claim 3, wherein the graphics processing engine is further to perform the blend operation for the pixel data using a constant zero value for the pixel data when the metadata indicates that the pixel data is transparent.

6. The graphics processing apparatus as in claim 1, further comprising a display engine to read the metadata associated with the tile of memory, output the pixel data via a display connector when the data characteristic indicates that the pixel data differs from the corresponding tile of the previous frame, and otherwise bypass the output of the pixel data.

7. The graphics processing apparatus as in claim 6, wherein, before the display engine is to output the pixel data for the current frame, the display engine is to read the first count that indicates the number of tiles in the current frame that differ from the previous frame, bypass the read of the metadata associated with the tile of memory, and output all pixel data for the frame when the first count is over a threshold.

8. A system on a chip integrated circuit including an application processor and a graphics processor, the graphics processor comprising:
a graphics processing engine to render pixel data to a tile of memory associated with a surface and write to metadata associated with the tile of memory that indicates a data characteristic of the pixel data, wherein the data characteristic of the pixel data includes an indicator that the pixel data of a current frame differs from a corresponding tile of a previous frame and metadata is associated with a first count that indicates a number of tiles in the current frame that differ from the previous frame,
wherein the graphics processing engine to store a second count to the metadata and, before a blend operation, read the second count indicating a number of tiles in a surface containing transparent pixel data and bypass a memory read operation for the metadata that indicates the pixel data is transparent when the second count indicates that the number of tiles in the surface that contain transparent pixel data is less than a threshold; and
a display engine to output the pixel data in the tile of memory via a display connector conditionally based on the metadata associated with the tile of memory.

9. The system on a chip integrated circuit of claim 8, wherein the graphics processing engine is to render transparent pixel data to the tile of memory, write to the metadata associated with the tile of memory to indicate that the tile contains transparent pixel data, and update a second count of transparent tiles on the surface.

10. The system on a chip integrated circuit of claim 9, wherein the display engine is to blend the surface with an additional surface before outputting blended pixel data, wherein before the display engine is to blend the pixel data in the tile of memory, the display engine is to read the metadata associated with the tile of memory and bypass a read of the pixel data in the tile of memory when the metadata indicates that the pixel data is transparent.

11. The system on a chip integrated circuit of claim 8, wherein the graphics processing engine is to render pixel data to the tile of memory, compare a hash computed for the pixel data in the tile of memory with a hash of pixel data of a corresponding tile of a previous frame, and write to the metadata associated with the tile of memory to indicate that the pixel data in the tile differs from the previous frame.

12. The system on a chip integrated circuit of claim 11, wherein the display engine is to output the surface to a display device, wherein before the display engine is to output the pixel data in the tile of memory, the display engine is to read the metadata associated with the tile of memory, bypass output of the pixel data in the tile of memory when the metadata indicates that the pixel data does not differ from the previous frame and output the pixel data in the tile of memory when the metadata indicates that the pixel data differs from the previous frame.

13. A method comprising:
rending, by a graphics processing engine configured for tiled memory access, pixel data to a tile of memory and write to metadata associated with the tile of memory that indicates a data characteristic of the pixel data, wherein the data characteristic of the pixel data includes an indicator that the pixel data of a current frame differs from a corresponding tile of a previous frame and metadata is associated with a first count that indicates a number of tiles in the current frame that differ from the previous frame; and
storing, by the graphics processing engine, a second count to the metadata and, before a blend operation, reading the count indicating a number of tiles in a surface containing transparent pixel data and bypass a memory read operation for the metadata that indicates the pixel data is transparent when the count indicates that the number of tiles in the surface that contain transparent pixel data is less than a threshold.

14. The method as in claim 13, wherein the data characteristic of the pixel data is to indicate that the pixel data is transparent.

15. The method as in claim 13, further comprising during a blend operation, reading, by the graphics processing engine, the metadata associated with the tile of memory and bypass a memory read operation for the pixel data in the tile of memory when the metadata indicates that the pixel data is transparent.

16. The method as in claim 15, further comprising bypassing, by the graphics processing engine, the blend operation when the metadata indicates that the pixel data is transparent.

17. The method as in claim 15, further comprising performing, by the graphics processing engine, the blend operation for the pixel data using a constant zero value for the pixel data when the metadata indicates that the pixel data is transparent.

18. The method as in claim 13, further comprising reading, by a display engine, the metadata associated with the tile of memory, outputting the pixel data via a display connector when the data characteristic indicates that the pixel data differs from the corresponding tile of the previous frame, and otherwise bypass the output of the pixel data.

19. The method as in claim 18, wherein, before the display engine is to output the pixel data for the current frame, the display engine is to read the first count that indicates the number of tiles in the current frame that differ from the previous frame, bypass the read of the metadata associated with the tile of memory, and output all pixel data for the frame when the first count is over a threshold.

20. At least one non-transitory computer-readable medium having stored thereon instructions that, when executed, cause a computing device to perform operations comprising:

rendering, by a graphics processing engine configured for tiled memory access, pixel data to a tile of memory and write to metadata associated with the tile of memory that indicates a data characteristic of the pixel data, wherein the data characteristic of the pixel data includes an indicator that the pixel data of a current frame differs from a corresponding tile of a previous frame and metadata is associated with a first count that indicates a number of tiles in the current frame that differ from the previous frame; and storing, by the graphics processing engine, a second count to the metadata and, before a blend operation, reading the count indicating a number of tiles in a surface containing transparent pixel data and bypass a memory read operation for the metadata that indicates the pixel data is transparent when the count indicates that the number of tiles in the surface that contain transparent pixel data is less than a threshold.

21. The non-transitory computer-readable medium as in claim 20, wherein the data characteristic of the pixel data is to indicate that the pixel data is transparent.

22. The non-transitory computer-readable medium as in claim 20, wherein the operations further comprise during a blend operation, reading, by the graphics processing engine, the metadata associated with the tile of memory and bypass a memory read operation for the pixel data in the tile of memory when the metadata indicates that the pixel data is transparent.

23. The non-transitory computer-readable medium as in claim 22, wherein the operations further comprise bypassing, by the graphics processing engine, the blend operation when the metadata indicates that the pixel data is transparent.

24. The non-transitory computer-readable medium as in claim 22, wherein the operations further comprise performing, by the graphics processing engine, the blend operation for the pixel data using a constant zero value for the pixel data when the metadata indicates that the pixel data is transparent.

25. The non-transitory computer-readable medium as in claim 20, wherein the operations further comprise reading, by a display engine, the metadata associated with the tile of memory, outputting the pixel data via a display connector when the data characteristic indicates that the pixel data differs from the corresponding tile of the previous frame, and otherwise bypass the output of the pixel data.

26. The non-transitory computer-readable medium as in claim 20, wherein, before the display engine is to output the pixel data for the current frame, the display engine is to read the first count that indicates the number of tiles in the current frame that differ from the previous frame, bypass the read of the metadata associated with the tile of memory, and output all pixel data for the frame when the first count is over a threshold.

* * * * *